Sept. 1, 1964 F. G. STEELE 3,147,371

SIMPLIFIED METHODS AND APPARATUS FOR DIGITAL COMPUTATION

Filed March 25, 1957 5 Sheets-Sheet 1

INVENTOR:
Floyd G. Steele

By Seymour Scholnick
Attorney

INVENTOR:
Floyd G. Steele
By Seymour Scholnick
Attorney

Sept. 1, 1964 F. G. STEELE 3,147,371

SIMPLIFIED METHODS AND APPARATUS FOR DIGITAL COMPUTATION

Filed March 25, 1957 5 Sheets-Sheet 3

INVENTOR:
Floyd G. Steele

By Seymour Acholnick
Attorney.

SIMPLIFIED METHODS AND APPARATUS FOR DIGITAL COMPUTATION

Filed March 25, 1957 5 Sheets-Sheet 4

INVENTOR.
Floyd G. Steele

By Seymour Schalnick
Attorney.

Sept. 1, 1964 F. G. STEELE 3,147,371

SIMPLIFIED METHODS AND APPARATUS FOR DIGITAL COMPUTATION

Filed March 25, 1957 5 Sheets-Sheet 5

INVENTOR:
Floyd G. Steele

By Seymour Scholnick

Attorney.

United States Patent Office 3,147,371

Patented Sept. 1, 1964

3,147,371

SIMPLIFIED METHODS AND APPARATUS FOR DIGITAL COMPUTATION

Floyd G. Steele, La Jolla, Calif., assignor to Digital Control Systems, Inc., La Jolla, Calif.

Filed Mar. 25, 1957, Ser. No. 648,321
41 Claims. (Cl. 235—152)

The present invention relates to methods and apparatus for accomplishing digital computation with greatly reduced amounts of equipment, and more particularly to a simplified digital computer which requires far less equipment than conventional prior art computers and yet is capable of general solution of any desired problems.

To exemplify the usefulness of the computer of the invention, especially in the supposedly difficult field of machine or system control, in the present application a specific embodiment of the computer of the invention is presented, which is adapted for the automatic control of an industrial pallet loading machine, a type of machine which receives boxes of merchandise from a conveyor and stacks groups of these boxes in regular array on wooden pallets which are then removed by conveyor from the machine.

As herein mechanized the control of the pallet loading machine, hereinafter called the pallet loader, involves the cooperative and interrelated control by the computer of a solenoid and six motors which actuate various elements of the pallet loader, this control being established in accordance with mathematical operations performed upon a large number of input signals supplied to the computer by sensing devices on the pallet loader and in accordance with a number of counts continually stored within the computer. These counts represent the number of boxes that have entered any line of boxes, the number of lines that have entered any layer of boxes, and the number of layers that have entered any stack of boxes.

To accomplish the above-mentioned control functions, the computer, in each of its cycles of operation, samples all of the input signals, stores and operates upon these signals and upon the stored counts that it maintains, makes innumerable decisions, and in accordance with a complex box stacking pattern produces resultant output signals which are applied back to the pallet loader to control the energization or deenergization, and direction of motion of the pallet loader motors. Cycles of operation are repeated often enough (in the present embodiment about 10 to 60 cycles a second) so that effectively continuous control is maintained.

However the amount of equipment utilized by the computer of the invention for accomplishing these control operations is very small and comprises merely a cyclically operating short memory channel with associated read and write circuits, a synchronized long memory channel with appropriate read circuits, a device (here a flip-flop K) for storing a single signal, and a very simple and elementary gating network.

In accomplishing the control of the pallet loader, the present embodiment of the computer of the invention replaces perhaps 40 to 74 relays having between them about 150 to 400 contacts and wiring therebetween. As will be shown hereinbelow, the relays are effectively replaced by signals stored in the short memory channel, while the contacts and wiring are replaced by predetermined sequences of instruction representing signals stored in the long memory.

The above figures however are not a true measure of the mathematical power of the computer of the invention for, as will be shown hereinbelow, by merely increasing the length of the long channel and short channel as required, problems of ever-increasing complexity may be successfully solved by the computer of the invention, including large numerical problems such as are ordinarily solved by medium or large sized general purpose computers employing perhaps hundreds of flip-flops and thousands of gating diodes.

To explain how such drastic equipment reductions are obtained in the computer of the present invention it is best to first clearly understand how computation is carried on in prior art digital computers as for example computers utilizing large networks of relays or electrical flip-flops. Considering a flip-flop computer, in such a device at each cycle of operation thereof the flip-flops interact upon themselves and upon each other, so that the new signal formed in each flip-flop is determined as a fixed (wired in) Boolean function of the signals that were stored in a number of other flip-flops and possibly itself. For example each signal L formed in a flip-flop L may be formed as the fixed or predetermined function $$L=MNF+GQ'R$$

of the values of six signals M, N, F, G, Q and R stored in corresponding flip-flops.

Thus each signal L is defined as a predetermined or fixed Boolean function of six variables (read as, L is to have a 1 value if M=1 and N=1 and F=1 or G=1 and Q=0 and R=1). In the prior art, to form signal L, the signals M, N, F, G, Q, R would be applied at each timing interval to a gating matrix having ordinarily approximately as many gating elements as applied signals, and the applied signals would be combined to form signal L. Thus the defined function of six variables would be immediately formed, by using a roughly corresponding number of gating elements. Each of the six applied signals, (M, N, F, G, Q, R) would be similarly defined as a function of many variables and would be similarly mechanized and stored in their corresponding six flip-flops. Thus a great proliferation of gating elements and flip-flops is created.

In contrast, if the same operation were to be performed by the computer of the present invention a function of 6, or in the general case $n$, variables would be formed by building up the function of $n$ variables through repeated formations of functions of less than $n$ variables, this being accomplished through repeated selective use of a single set of elementary gates.

The lowest level at which computation of this type can be accomplished is with functions of two and one variables and the greatest equipment reductions result from restricting oneself to these functions. Thus in the specific embodiment of the invention shown hereinbelow only a few selected functions of two variables are utilized.

To illustrate such stepwise computation through repeated selective use of elementary gates, consider now, as an example, how the signal L=MNF+GQ'R might be formed in the specific embodiment of the computer described in the present application.

Assume that signals M, N, F, G, Q', R are stored in separate cells in the short memory and are serially presented at a read station. Assume further that there is a storage device (a flip-flop K) capable of storing a single signal. Signal L may be formed by the following steps:

(1) Store a 1 valued signal in K. The function selected is K=1.

(2) When signal R appears at the read station A, combine it with the signal (1) in K to store R in K. The function selected is K=AK.

(3) When signal Q appears, combine it with the signal in K to form Q'R (a single signal) in K'. The function selected is K=A'K.

(4) When signal G appears, combine it with the signal in K to form GQ'R in K. The function selected is K=AK.

(5) The signal GQ'R is recorded in a cell of the channel by applying it to a write station B. The function selected is B=A.

(6) Store a (1) in K. The function selected is K=1.

(7) When signal F appears, combine it with the signal (1) in K to form F in K. The function selected is K=AK.

(8) When signal N appears, combine it with the signal in K to form NF in K. Function selected is K=AK.

(9) When signal M appears, combine it with the signal in K to form MNF in K. Function selected is K=AK.

(10) During the next recirculation of the channel, when recorded signal GQ'R appears, combine it with the signal in K to form MNF+GQ'R in K, thus forming L in K. Function selected is K=A+K.

It is seen that in the above steps the function L=MNF+GQ'R was built up step-by-step, by successively combining the separate signals in accordance with a few selected functions of two variables. Note that in this process, the same gating elements may be repetitively used. For example to form the successive signals in K, as described a single gating network could be utilized which is selectively operable for forming the signal in K in accordance with any selected one of the three functions K=1, K=AK, K=A'K.

A similar selectively operable gating network could be provided for applying signals to the write station B. (It should be understood that each flip-flop may be utilized as part of its own gating circuit and through its inherent electrical and logical feedback operation may permit logical signal combining to be done without actually utilizing the output signal of the flip-flop. This is done for example, in the present application, with flip-flop K.)

In the specific embodiment of the invention to be described, the gating networks are selectively operable for performing the above and a few additional functions. As will appear hereinbelow, many different sets of functions may be utilized for performing generalized computation upon the signals in the short channel.

The choice or selection as to which the elementary functions is to be utilized at any given appearance of a signal is made by instruction representing program signals presented by the long memory channel.

Within the long program channel there are stored many sequences of a few elementary instructions, each instruction being represented by a corresponding combination of stored program signals. The short channel recirculates many times during one turn of the program channel. At each successive recirculation of the short channel the synchronized program channel presents a corresponding sequence of instructions, each sequence comprising a series of as many instructions as there are signals to be operated upon. Each instruction designates what operation is to be performed upon the corresponding signal, this being accomplished by applying the corresponding program signals to the gating networks to select the functions they will perform.

In this remarkably simple and economical manner, the predetermined program instructions direct exactly what operations will be performed upon each cell of the short channel at each of the successive recirculation of the channel, the program instructions being situated at corresponding appropriate positions in the program channel.

To a great extent, as will appear hereinbelow, mathematical power in the computer is created by providing the few elementary instructions in many different sequences so that the computer will perform many different sequences of operations upon the signals in the short channel during corresponding successive recirculations of the channel. It is only in this way that practically useful progressive operations upon the signals in the information channel can be accomplished, particularly the operation, which is very desirable in nearly all applications, of forming and recording signals representing incomplete parts of desired logical functions in predetermined cells of the short channel, and later during succeeding recirculations of the channel reading these signals back and utilizing them in forming the complete logical functions. For relatively simple problems, such as the control of the pallet loader, 20 to 100 different program sequences will be sufficient. For increasingly more complex problems, the number of different instruction sequences required will increase to several thousand. It appears that solution of practically useful problems cannot be solved without provision of at least 10 different instruction sequences.

From the above provided example of the formation of signal L, it is clear that signals stored in the short channel can be considered to represent Boolean variables (thus representing flip-flops or relays or any other bivalued quantities) and that any desired functions of these variables can be formed with the simple mechanism described hereinabove. Thus within the memory of the computer "simulated" relays or flip-flops can be made to operate upon each other and upon applied input signals and produce desired output signals, just as they would in a very much larger computer.

The above however is an unnecessarily restricted view of the computer of the invention. Basically it is a device performing any desired logical operations upon signals stored in the information channel (or other serially applied signals). To attempt always to structure its memory so as to simulate existing types of computers would establish a mental straight-jacket. With a form of computer now available for directly performing determined logical operations upon signals, the attempt should usually be made in analysing any system to formulate required output signals directly as logical functions of available input signals. This approach will ordinarily produce important simplifications.

For example in analysing the control of the pallet loader, it was possible to write Boolean equations relating to each of the required output signals to corresponding functions of available input signals and of counts maintained within the computer. Then it could be seen which types of elementary functions could best be utilized in solving these equations. For example, there was a considerable amount of counting to be done so that the use of the logical difference function was obviously convenient. Also, it could be seen that most of the input signals were involved in a number of different equations so that entry of such input signals into the short channel so as to be continually available there for repeated use was indicated, rather than to directly operate upon them (although this too was done at convenient points).

It is therefore an object of the invention to provide simplified methods and apparatus for accomplishing digital computation by forming predetermined functions of $n$ stored variables, through stepwise formation of functions of less than $n$ variables.

It is another object of the invention to provide methods and apparatus for forming a desired function of $n$ stored signal variables by successively serially reading and combining the variables in accordance with selected functions of $m$ ($m<n$) variables through repetitive use of a single elementary gating network which is selectively operable for combining variables in accordance with the selected functions.

It is still another object of the invention to provide apparatus of the above-described type, wherein the variables are stored in a short recirculating channel and are serially combined through said gating network in successive recirculations in accordance with functions selected by many varying sequences of program signals synchronously presented to the gating network.

It is yet another object of the invention to provide a simplified digital computer including apparatus for forming and recording in a short recirculating channel signals representing incomplete parts of desired logical functions and later reading these signals back for use in forming the complete logical functions.

It is still another object of the invention to provide a simplified digital computer having an $n$-cell recirculating channel for storing signals to be operated upon, apparatus for synchronously presenting a sequence of $n$ corresponding instructions for each of $m$ recirculations of the $n$-cell channel, each instruction completely designating a selected one of a few elementary logical operations, and means for operating upon the signal in each cell in accordance with the corresponding selected elementary logical operation.

Another object of the invention is to provide a computer of the above-described type wherein $m$ is at least 10 and at least 10 of the instruction sequences are different from one another.

It is yet another object of the invention to provide a digital control computer, for controlling a machine by scanning, in each cycle of its operation, a plurality of bivalued input signals supplied by the machine, each input signal representing the condition of a corresponding element of the machine; storing the applied input signals in a short recirculating channel; serially combining the stored signals throughout many recirculations of the short channel to form a number of output signals, each representing a predetermined Boolean function of the input signals; and applying each output signal to the machine to energize corresponding separate actuators of the machine.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
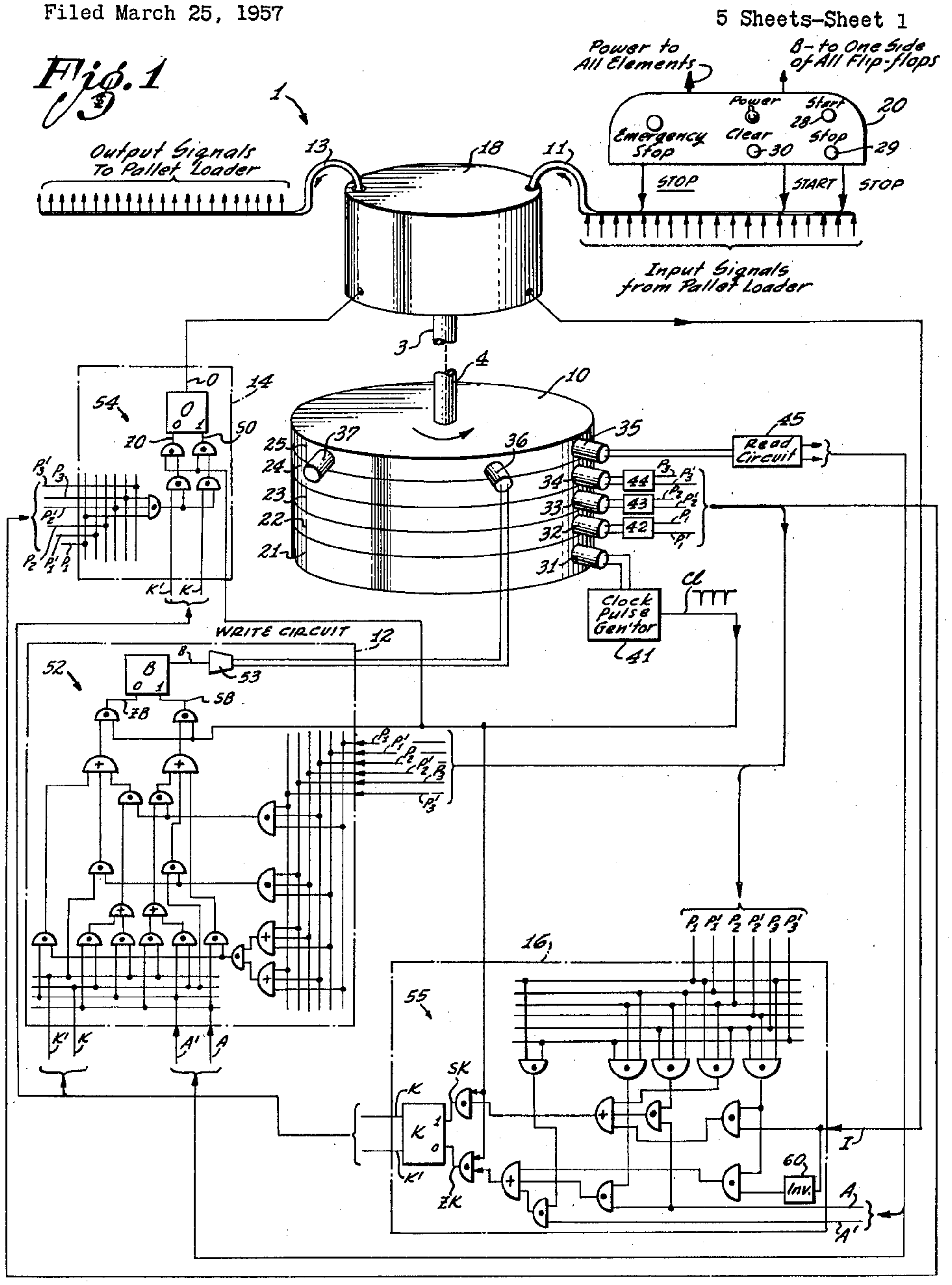
FIG. 1 is a drawing illustrating the substantially complete mechanical and electrical structure of a specific embodiment of the computer of the invention, as adapted for the control of a pallet loading machine.

Referring now to the drawings there is shown in FIG. 1 a preferred embodiment of a simplified electronic digital computer in accordance with the invention. As shown in FIG. 1 the preferred embodiment of the invention is seen to include a rotatable magnetic drum 10 with associated magnetic transducers for reading and writing signals on the surface of the drum; a write circuit 12; an output circuit 14; a storage and combining circuit 16; an input-output commutator 18, and a control panel 20 including a plurality of control switches which are utilized for generating electrical signals which are utilized to initiate and control the various operations of the computer.

As illustrated in FIG. 1, the computer of the invention has been adapted for the automatic control of an industrial pallet-loading machine, a type of machine which receives boxes of merchandise from a conveyor and stacks groups of these boxes in regular array on wooden pallets which are then removed by conveyor from the machine and are later lifted away by fork trucks.

Figure 3:
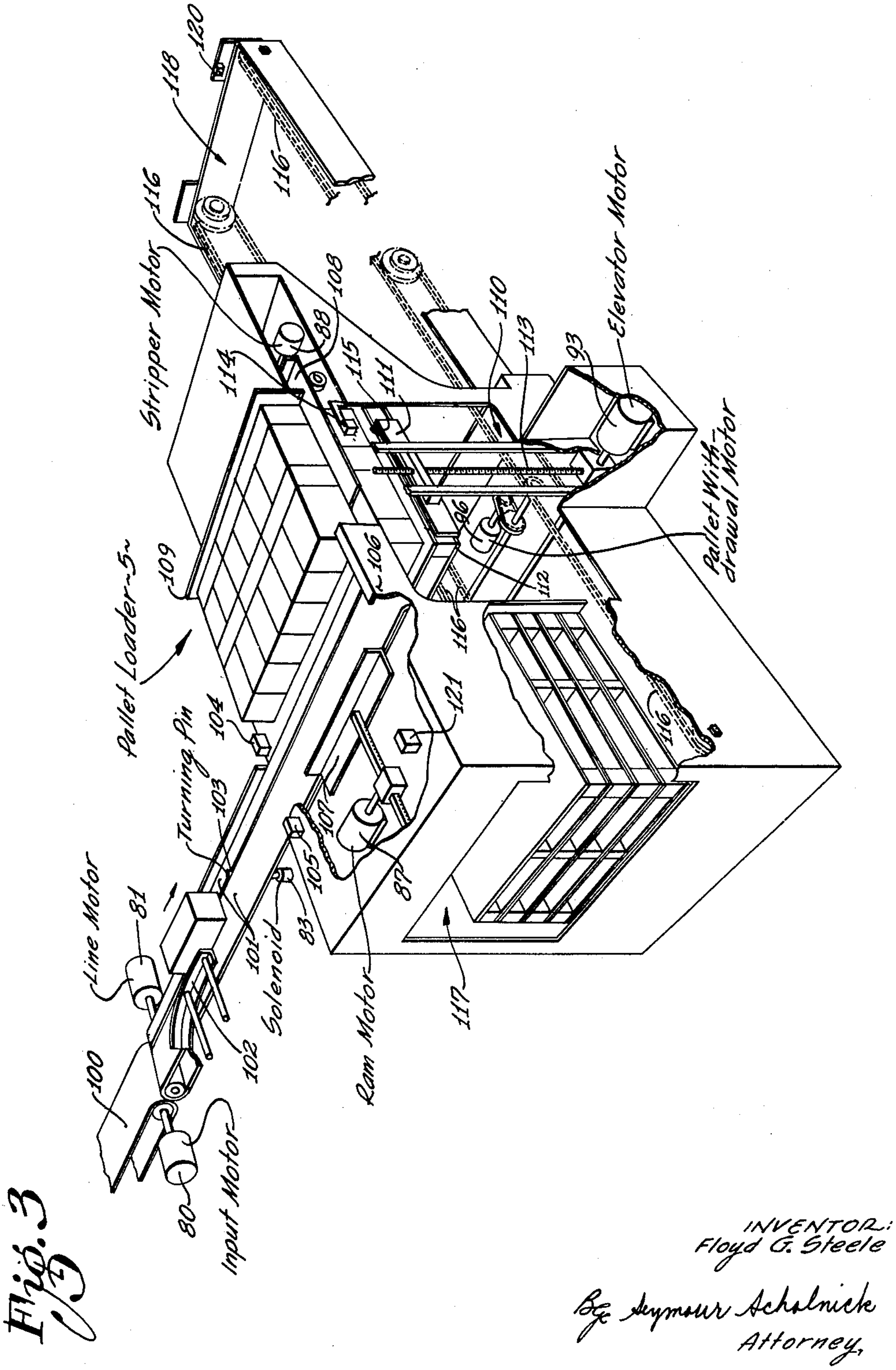
FIG. 3 is an isometric view of the mechanical structure of the pallet loader.

A suitable form of pallet-loader machine, designated as pallet 5 is shown in FIG. 3 and will later be described in detail. However in considering the embodiment of the computer shown in FIG. 1, it is sufficient for the present to state that pallet-loading machine 5 includes a number of motors, solenoids and other actuators which drive various sections of the machine, and also includes a number of limit switches, photocells, overload sensors, and other devices which sense the operations of the machine.

The overall operation of the computer in its present application is that in each cycle of its operation (corresponding to a rotation of drum 10) it receives from pallet loader 5 a plurality of bivalued input signals representing the conditions of the various sensing devices and operates upon these input signals to form a plurality of resultant bivalued output signals which are applied back to pallet loader 5 to control the energization or stoppage of the various actuators and their direction of motion in accordance with the desired operation of the pallet loader.

The computer also develops a set of bivalued output signals $u_1, u_2 \ldots u_{10}$, which represent in binary code the totalized dollar value of the pallets loaded, and which may be supplied to a suitable printer or other display device for reading out this totalized value.

As shown in FIG. 1, the input signals formed in pallet loader 5 are applied via an input cable 11 to commutator 18 which functions to serially commutate or multiplex these input signals onto a single conductor I to form a corresponding multiplexed bivalued input signal I which in the embodiment of the invention shown in FIG. 1 is applied to one input of storage and combining circuit 16. It will be noted, in FIG. 1, that a few additional input signals (the signals stop, start, and $\underline{\text{stop}}$) are also entered into input cable 11, these additional input signals being provided from switches on control panel 20 to allow manual control from control panel 20 of starting and stopping of pallet loader 5.

As further shown in FIG. 1, all of the output signals produced by the computer are formed by output circuit 14 as a single multiplexed bivalued output signal O which is applied to commutator 18 over a correspondingly designated conductor O, the high or low voltage level of signal O representing, at predetermined successive times, the 1 or 0 values of the various separate output signals. Within commutator 18, the multiplexed output signal O is coupled at these predetermined times to the separate output conductors of output cable 13 to thereby form on these conductors the separate output signals illustrated in FIG. 1.

Although commutator 18 may be mechanized in many ways, in accordance with the invention as for example by diode switching circuits or by an electrical switching tube or other multi-output, multi-input devices, as illustrated in FIG. 1, commutator 18 is provided as a conventional brush-segment type of mechanical commutator having a brush-drive shaft 3 which is directly coupled to a central spindle 4 of drum 10 so that commutator 18 is in operation synchronized with rotation of drum 10.

Figure 2:
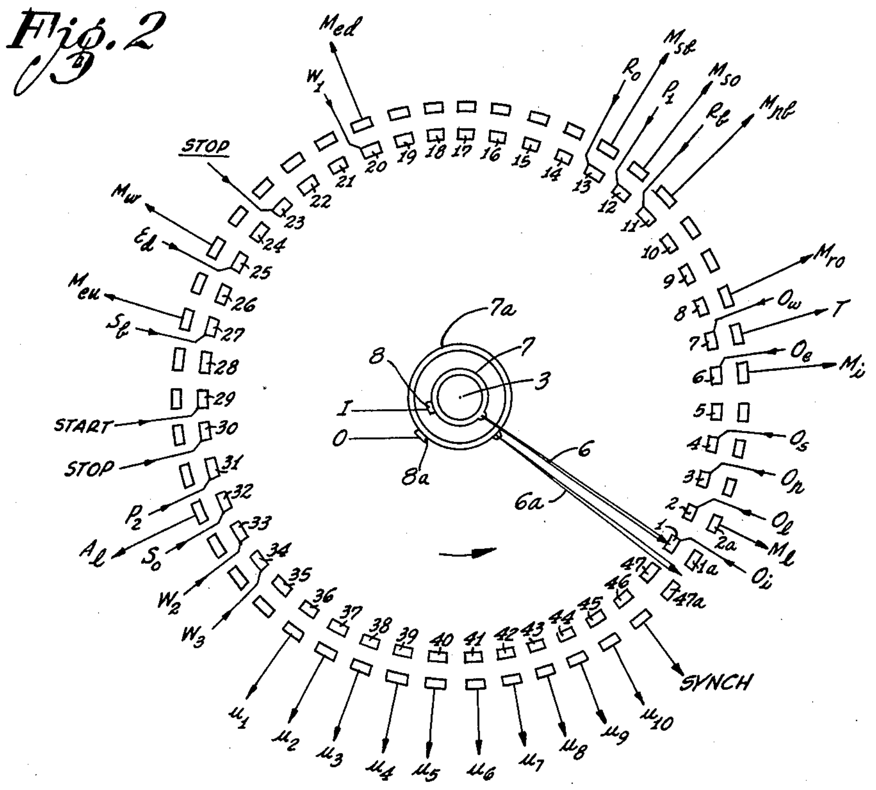
FIG. 2 is an axially directed view of the interior structure of a commutator which is utilized in the computer shown in FIG. 1.

Referring now to FIG. 2 there is shown in detail the structure of a preferred embodiment of brush-segment commutator 18. As shown in FIG. 2, commutator 18 includes a deck or circle of 47 evenly spaced input commutator segments designated in FIG. 2 as segments 1, 2 . . . 47 to which the various input signals $O_l$, $O_l$, $O_r$, etc. are applied from input cable 11, and also includes a second outer deck or circle of 47 corresponding output segments designated 1$a$, 2$a$ . . . 47$a$, respectively, from which the output signals $M_l$, $M_i$, T, etc., are derived for entry into output cable 13. To promote clarity of presentation most of the output segments are not numbered in FIG. 2 but will be understood to have the same numerical designation as the corresponding adjoining input segments.

Commutator 18 also includes an input brush 6 and an output brush *6a* insulatively mounted on brush-drive shaft 3, so that in operation input brush 6 is rotated with drive shaft 3 to cyclically make contact with input segments 1–47 and output brush *6a* is rotated to cyclically make contact with output segments *1a–47a*.

Input conductor I is electrically connected to input brush 6 by means of a slip ring 7 and a sliding contact block 8, while output conductor O is similarly connected to output brush *6a* via a slip ring *7a* and a sliding contact block *8a*.

It is thus clear that in operation, input signals applied to the input segments will be successively sampled by input brush 6 and will thereby be commutated onto conductor I to form the multiplexed input signal I. Similarly output signals applied at appropriate times in the multiplexed output signal O will be commutated onto corresponding output segments to form the various separate output signals.

As illustrated in FIG. 2, output brush *6a* is slightly offset with respect to input brush 6, so that at a time when input brush 6 is centrally located on an input segment, output brush *6a* is not in contact with any output brush-segment and will only later make contact with the corresponding output segment. The reason for this configuration will be apparent at a later point in this specification.

In addition it will be understood that brushes 6 and *6a* are initially positioned so that in operation they will contact the various segments at times corresponding to predetermined angular positions of drum 10. In this way synchronization is established, as will hereinafter appear between the receiving of input signals by the computer, and the reading of "program" signals stored about the periphery of drum 10 which it will be shown, directs what shall be done with these input signals. Synchronization is similarly established between the formation of output signals in multiplexed output signal O as directed by "program" signals being read from drum 10 and the application of these output signals by commutator 18 to the corresponding output segments.

The precise timing relationship existing between the contacting of the various input and output segments, and the reading of program signals from drum 10 will be later explanied in detail.

Referring again to FIG. 1, as there illustrated drum 10 has five magnetized tracks designated 21, 22, 23, 24 and 25, respectively, established about its periphery.

In track 21, a timing signal waveform or so-called clock pulse waveform is permanently recorded, this waveform comprising, in the present embodiment of the computer, 4700 evenly spaced timing signals recorded about the periphery of the drum as successively adjacent regions or cells of the drum surface alternately magnetized in opposite directions of polarization. Upon rotation of drum 10, each passage of a timing signal beneath a read transducer 31, positioned adjacent track 21, causes the transducer to produce a corresponding electrical signal which is applied to a wave shaping circuit or clock pulse generator 41 which converts the signals to an output train of sharp electrical "clock" pulses *Cl*. Each appearance of a clock pulse *Cl* indicates the passage of one of the magnetized timing cells of track 21 beneath transducer 31.

As shown in FIG. 1, clock pulses *Cl* are applied to write circuit 12, output circuit 14, and storage and combining circuit 16 and are utilized therein to synchronize the operation of these circuits. Transitions in the 1 or 0 states of flip-flops contained in these circuits are made in synchronization with applied clock pulse signals. In addition, recording in magnetic form of bivalued 1 or 0 signals upon all of the memory tracks and reading of signals from these tracks is synchronized with the clock pulses in such a manner that these tracks are effectively divided into discrete storage cells corresponding to the timing track cells.

Thus for example, tracks 22, 23 and 24 each contain 4700 successive storage cells. Each cell has a 1 or 0 valued signal stored therein, these signals being the program signals hereinbefore mentioned. The program signals stored in tracks 22, 23 and 24 are read by three read transducers 32, 33 and 34 respectively, which are coupled to corresponding read amplifiers 42, 43 and 44, respectively. During each timing interval (as defined by successive clock pulses *Cl*) three program signals, each having a 1 or 0 value, are simultaneously read from tracks 22, 23 and 24, these simultaneously read signals being amplified and reshaped by read amplifiers 42, 43 and 44 to form corresponding voltage level program signals $P_1$, $P_2$ and $P_3$, respectively. Each of the voltage level program signals $P_1$, $P_2$ and $P_3$ has a high (1 representing) or low (0 representing) level during the timing interval in accordance with the 1 or 0 value of the corresponding signal being read. Voltage level program signals $P'_1$, $P'_2$ and $P'_3$, which are complementary (reversed in level) to signals $P_1$, $P_2$ and $P_3$ are also formed by amplifiers 42, 43 and 44, respectively.

It is clear therefore that during each of the 4700 timing intervals required for a rotation of drum 10, a group of three stored program signals will be simultaneously read from tracks 22, 23 and 24, the 1 or 0 values of these stored program signals being represented by the corresponding high or low levels of program signals $P_1$, $P_2$ and $P_3$, respectively. Each group of simultaneously read signals represents what will be called a program instruction, a program instruction being a designation as to what operations are to be performed by other elements of the computer during that timing interval.

In order to affect the other elements of the computer in the execution of these program instructions, as shown in FIG. 1 the program signals $P_1$, $P_2$ and $P_3$ (and also the complementary signals $P'_1$, $P'_2$, $P'_3$) are applied to write circuit 12, output circuit 14 and storage and combining circuit 16 to control the operations of these circuits in accordance with the represented instructions. The precise significance of these program instructions and the manner in which circuits 12, 14 and 16 are controlled by program signals $P_1$, $P_2$ and $P_3$ (and complementary program signals $P'_1$, $P'_2$, $P'_3$) for the accomplishing of the represented instructions will be explained at a later point in the specification.

Referring now to track 25, in the present embodiment of the invention a recirculating channel hereinafter designated as the information channel, which is capable of storing 100 bivalued signals, is maintained in operation over that section of track 25 which lies between a write transducer 36 and a remote read transducer 35 positioned at a spacing of 100 cells from the write transducer. The information channel is maintained in recirculation through cooperation of channel 25 with write circuit 12, write transducer 36, read transducer 35 and a read amplifier 45.

In the operation of the information channel, a bivalued signal is recorded on track 25, during each timing interval, by write circuit 12 via write transducer 36. A permanent magnet erase transducer 37 is positioned adjacent track 25 to place elements of track 25 in a uniform condition of magnetization before signals are recorded thereon by write transducer 36. The signals so recorded are carried, by reason of rotation of drum 10 to read transducer 35 which is spaced from write transducer 36 by a distance corresponding to 100 cells. Read transducer 35 responds to the signals it receives by producing corresponding electrical signals, these signals benig amplified and reshaped by read amplifier 45 to form a corresponding voltage level read signal A (and also a complementary read signal A') whose high and low levels represent the 1 or 0 values of the signals being read. Read signals A and A' are in turn applied to an input of circuit 16 and to one input of write circuit 12, circuit 12 in response thereto either re-recording the signals which have just been read or recording modified or substituted signals in accordance with the program instructions represented by the applied program signals $P_1$, $P_2$, $P_3$, $P'_1$, $P'_2$, $P'_3$.

In this way one-hundred bivalued signals may be continually maintained in recirculation in the information channel. Moreover each signal as it is being recorded by write circuit 12 on track 25 may be selectively altered or substituted for in accordance with the simultaneously occurring program instruction applied to write circuit 12.

More particularly, as will be demonstrated hereinbelow, the value of each signal which is recorded in the information channel is determined as a predetermined Boolean function of two bivalued quantities represented respectively by the signal being read from the information channel (as signal A) and a signal which is stored in a flip-flop K which as will hereinafter appear is included within storage and combining circuit 16. The particular Boolean function of two variables by which the value of the recorded signal is determined, is selected by the simultaneously occurring program instruction.

Stating this in another way, it can be said that each signal which is recorded in the information channel is formed by combining the signal then being read from the information channel with the signal stored in flip-flop K in accordance with a predetermined Boolean function of two variables as selected or determined by the simultaneously presented program instruction.

Considering now more particularly the structure of write circuit 12, this circuit as shown in FIG. 1 is seen to comprise a flip-flop B and a logical gating network generally designated 52. At the end of each timing interval flip-flop B may be selectively set to its 1 or 0 state by signals SB or ZB respectively, which are selectively applied thereto by network 52, the flip-flop producing an output signal B during the following time interval which is high or low in accordance with the 1 or 0 state of the flip-flop. The output signal B is the signal which is recorded in the information channel and is applied via a write amplifier 53 to write transducer 36, so that a corresponding 1 or 0 valued signal is thereby recorded in the information channel.

Network 52, as illustrated in FIG. 1, is composed of a plurality of interconnected "and" and "or" gates. The network receives the read signals A and A', a pair of signals K and K' formed by flip-flop K, and the program signals, and is responsive to these signals for forming the set and zeroing signals SB and ZB, in such a way that each new value of the signal to be recorded (signal B) represents that Boolean function of signals A and K which is selected by the simultaneously presented program signals, as will be later explained in detail.

Considering now the structure of storage and combining circuit 16, as shown in FIG. 1 this circuit includes the flip-flop K and a logical gating network 55. Flip-flop K as hereinbefore mentioned is utilized for storing at any time a single bivalued signal, this being accomplished by having the flip-flop assume its 1 or 0 state to represent the 1 or 0 value of the stored signal. The flip-flop produces the output signal K (and also a complementary signal K') whose high or low level is representative of the state of the flip-flop and hence of the 1 or 0 value of the stored signal. The signals K and K' are applied to write circuit 12, as was hereinbefore described, and also to output circuit 14.

Network 55 in any timing interval may form a signal SK to set flip-flop K, may form a signal ZK to zero flip-flop K, may form neither of these signals thus leaving the flip-flop unchanged, or may simultaneously form both signals, this having the effect of triggering or reversing the state of the flip-flop. These set and zeroing signals are formed by network 55 in response to input signal I and read signals A and A' as determined by the program instructions represented by the applied program signals.

Although the signals stored in flip-flop K may sometimes be formed directly from applied input signals (appearing as signal I), in the great majority of instances the signals stored in K are formed as the result of operations performed on the signals being read from the information channel (as signal A).

More particularly, in so operating upon the signals of the information channel, each signal stored in K represents a selected Boolean function of the quantities represented by the signal read from the information channel (as signal A) and the signal previously stored in K, the particular selected Boolean function being determined by the simultaneously presented program instruction. Network 55 is mechanized so as to have the effect of storing the desired signals in flip-flop K, under the control of the program signals, as will appear hereinbelow.

Referring now to output circuit 14, as shown in FIG. 1, this circuit comprises a flip-flop O and a logical gating network 54. Network 54 receives the signals K and K' formed by flip-flop K and the program signals and in response thereto applies corresponding setting and zeroing signals SO and ZO to the input of flip-flop O in accordance with the program instruction represented by the simultaneously applied program signals.

In the present embodiment of the invention, all output signals are formed in the K flip-flop and are copied from there into the O flip-flop at appropriate times in response to simultaneously presented program instructions. Thus each value of signal O is formed as a selected Boolean function of signals O and K as determined by the simultaneously presented program instruction.

Much of the above provided explanation is summarized by the following statements (*a*)–(*d*).

(*a*) Each value of output signal O is determined as a selected Boolean function of the values of signal O and signal K.

(*b*) Each value of the signal (B) to be recorded in the information channel is determined as a selected Boolean function of the values of the signal read from the information channel (as signal A) and the signal stored in the K flip-flop (appearing as signal K).

(*c*) For the great majority of operations, each value of the signal stored in flip-flop K is determined as a selected Boolean function of the values of signals A and K.

(*d*) The abovementioned Boolean functions are selected or determined by the simultaneously presented program instructions. Very nearly all operations of the computer are carried on in this manner through successive formations of signals B, K and O in accordance with the simultaneously presented program instructions. Thus the operations of the computer are controlled by the significance and distribution of the stored program instructions.

Although there are 16 possible Boolean functions of two variables, only a few of these need be utilized—that is, be selectable by the program instructions to allow perfect generality of operation.

The program instructions utilized in the present embodiment of the invention allow the selection of three different Boolean functions of two variables for the formation of signal B from signals A and K, allow the selection of five different Boolean functions of two variables for the formation of a signal in flip-flop K from signal A and the signal previously stored in K, and allow the selection of two different functions in the formation of signal O from the signal previously stored in O and signal K. This provides sufficient generality of operation and is very convenient as will hereinafter appear. However it will be clear to those skilled in the art that many other and also reduced choice of Boolean functions could be utilized in accordance with the teachings of the invention. Some of these alternative choices of Boolean functions will be pointed out later in the specification.

To facilitate reference to the Boolean functions, the 16 possible Boolean functions designated $F_1 \ldots F_{16}$ of two variables designated $V_1$ and $V_2$ are illustrated below in tabular form in Table 1. The corresponding Boolean equations defining these functions are presented immediately following Table 1.

It will be noted that the functions of two variables include all of the functions of one variable.

TABLE 1

*Possible Functions of Two Variables*

[$V_1$ and $V_2$]

| $V_1$ | $V_2$ | $F_1$ | $F_2$ | $F_3$ | $F_4$ | $F_5$ | $F_6$ | $F_7$ | $F_8$ | $F_9$ | $F_{10}$ | $F_{11}$ | $F_{12}$ | $F_{13}$ | $F_{14}$ | $F_{15}$ | $F_{16}$ |
|---|---|---|---|---|---|---|---|---|---|---|---|---|---|---|---|---|---|
| 0 | 0 | 0 | 1 | 0 | 0 | 0 | 1 | 1 | 1 | 0 | 0 | 0 | 1 | 1 | 1 | 0 | 1 |
| 0 | 1 | 0 | 0 | 1 | 0 | 0 | 1 | 0 | 0 | 1 | 1 | 0 | 1 | 1 | 0 | 1 | 1 |
| 1 | 0 | 0 | 0 | 0 | 1 | 0 | 0 | 1 | 0 | 1 | 0 | 1 | 1 | 0 | 1 | 1 | 1 |
| 1 | 1 | 0 | 0 | 0 | 0 | 1 | 0 | 0 | 1 | 0 | 1 | 1 | 0 | 1 | 1 | 1 | 1 |

$F_1=0$
$F_2=V'_1V'_2$
$F_3=V'_1V_2$
$F_4=V_1V'_2$
$F_5=V_1V_2$
$F_6=V'_1$
$F_7=V'_2$
$F_8=V_1V_2+V'_1V'_2$
$F_9=V_1V'_2+V'_1V_2$
$F_{10}=V_2$
$F_{11}=V_1$
$F_{12}=V'_1+V'_2$
$F_{13}=V'_1+V_2$
$F_{14}=V_1+V'_2$
$F_{15}=V_1+V_2$
$F_{16}=1$ where in the equations above the superscript (′) indicates that the variable is to be complemented or reversed in value, a plus (+) indicates that the conjoined variables are to be combined in accordance with their logical "or" sum, and the absence of a + indicates that the conjoined variables are to be combined in accordance with their logical "and" product.

The particular program instructions utilized in the present embodiment of the invention will now be considered. Since the gating networks 52, 54 and 55 shown in FIG. 1, are mechanized so as to cooperate in carrying out these instructions, explanation of the specific structure of these networks will be deferred until the program instructions have been presented. Then the structure of networks 52, 54 and 55 will be developed from a fundamental consideration of the manner in which the computer is required to operate in response to presented program instructions.

The program instructions utilized in the present embodiment of the invention, designated as instructions 0–7 respectively, are listed in the following table, Table 2.

TABLE 2

| Instruction number | Instruction name | Values of program signals in tracks | | | Operations performed by computer | | |
|---|---|---|---|---|---|---|---|
| | | 24 | 23 | 22 | Record | Store in flip-flop K | Store in flip-flop O |
| 0 | Do Nothing | 0 | 0 | 0 | $B_n=A$<br>$F_{11}$<br>Record in the information channel (as signal B) the signal read from the information channel (as signal A) thus rerecording the signal without change. | $K_n=K$<br>$F_{10}$<br>The signal stored in flip-flop K is left unchanged. | $O_n=O$<br>$F_{10}$<br>The signal stored in flip-flop O is left unchanged. |
| 1 | Decode A | 0 | 0 | 1 | do | $K_n=AK$<br>$F_5$<br>Store in flip-flop K a signal representing the logical "and" product of the signal read from the information channel (as signal A) and the signal previously stored in flip-flop K. | Do. |
| 2 | Decode A′ | 0 | 1 | 0 | do | $K_n=A'K$<br>$F_3$<br>Store in flip-flop K a signal representing the logical "and" product of the complement of the signal emerging from the information channel (as signal A) and the signal previously stored in flip-flop K. | Do. |
| 3 | Count | 0 | 1 | 1 | $B_n=AK'+A'K$<br>$F_4$<br>Record in the information channel a signal representing the logical difference of the signal emerging from the information channel (as signal A) and the signal stored in flip-flop K. | $K_n=AK$<br>$F_5$<br>Store in flip-flop K a signal representing the logical "and" product of the signal read from the information channel (as signal A) and the signal previously stored in flip-flop K. | $O_n=O$<br>$F_{11}$<br>The signal stored in flip-flop O is left unchanged. |
| 4 | Copy K | 1 | 0 | 0 | $B_n=K$<br>$F_{10}$<br>Record in the information channel the signal stored in flip flop K. | $K_n=K$<br>$F_{10}$<br>Same as for instruction 0. | Do. |

TABLE 2—Continued

| Instruction number | Instruction name | Values of program signals in tracks | | | Operations performed by computer | | |
|---|---|---|---|---|---|---|---|
| | | 24 | 23 | 22 | Record | Store in flip-flop K | Store in flip-flop O |
| 5 | Read In-Out | 1 | 0 | 1 | $B_n=A$ $F_{11}$ Same as for instruction 0. | $K_n=I$ Store in flip-flop K the input signal (as represented by by signal I). | $O_n=K$ $F_{10}$ Store in flip-flop O the signal stored in flip-flop K. |
| 6 | Sum | 1 | 1 | 0 | do | $K_n=A+K$ $F_{15}$ Store in flip-flop K a signal representing the logical "or" sum of the signal emerging from the information channel (as signal A) and the signal previously stored in flip-flop K. | $O_n=O$ Same as for instruction 0 |
| 7 | Set K | 1 | 1 | 1 | do | $K_n=1$ $F_{16}$ Store a one-valued signal in flip-flop K. | $O_n=O$ Same as for instruction 0 |

As illustrated in Table 2, the eight different instructions which are utilized are represented by the eight possible combinations of three program signals simultaneously read from tracks 24, 23, and 22, as represented by signals $P_3$, $P_2$ and $P_1$, respectively. Following each instruction, there is stated in Table 2 the operations performed by the computer at the end of a timing interval in response to receipt of that instruction during the timing interval.

It will be understood of course that the assignment of instructions to corresponding combinations of signals is arbitrary and may be made in any desired manner.

As hereinbefore explained three operations are involved, the recording of a signal in the information channel (accomplished by storing the signal in flip-flop B to make signal B represent the signal), the forming and storage of a signal in flip-flop K, and the forming of a signal in output flip-flop O to serve there as an output signal.

For purposes of summarization, there is also provided in Table 2, preceding the statements of operation, the corresponding Boolean equations which define the new values (as indicated by the subscript *n*) of the signals formed in B, K and O in terms of the selected Boolean functions. The designation, as shown in Table 2 of each function, is provided beneath the corresponding equations.

In the equations provided in Table 2, as explained hereinbefore, the symbol + indicates that the logical "or" operation (sometimes called the logical summing operation) is to be performed upon the quantities joined thereby, while the absence of a + indicates that the logical "and" operation (sometimes called the logical product operation) is to be performed upon the quantities joined thereby.

As an example, the equation $K_n=A+K$ indicates that the new value ($K_n$) of signal K is to be 1 only if either signal A or signal K has a 1 value, and will otherwise be 0.

As another example the equation $K_n=AK$ indicates that the new value ($K_n$) of signal K is to be 1 only if signal A and signal K both have 1 values.

Similarly the equation $K_n=A'K$ indicates that the new value ($K_n$) of signal K is to be 1 only if signal A has a 0 value(A') and signal K has a 1 value.

As a more complex example, the equation $$K_n=AK'+A'K$$

indicates that the new value ($K_n$) of signal K is to be 1 only if signals A and K have different values, that is if signal A is 1 and signal K is 0 or signal A is 0 and signal K is 1. The overall operation indicated by the right-hand side of this equation is sometimes called the logical differencing operation, and is expressed by the symbol (—). Thus if desired the equation $$K_n=AK'+A'K$$

may be rewritten in the form $K_n=A-K$.

Before proceeding to demonstrate the manner in which desired output signals are formed by the computer of the invention under the control of appropriately arranged program instructions, there will be provided a brief development of the structure of gating networks 52, 54 and 55. This will be accomplished by deriving specific Boolean equations defining the SB and ZB, SO and ZO, and SK and ZK setting and zeroing signals to thus define the structure of networks 52, 54 and 55.

Consider now the derivation of equations defining these setting and zeroing signals from an inspection of Table 2, the following overall equation for signals B, K and I may be written $$Bn=(AK'+A'K)(3)+K(4)+A(0+1+2+5+6+7) \quad (1)$$

$$O_n=K(5)+O(5') \quad (2)$$

$$K_n=AK(1+3)+A'K(2)+(A+K)(6)+1(7)+K(0+4)+I(5) \quad (3)$$

where the numbers 0, 1, 2 . . . 7 in parentheses, each represent the presence of the correspondingly numbered instructions.

Having now the overall Eqs. 1, 2 and 3 which define the output signals of flip-flops B, O and K, the corresponding equations may be immediately written for the setting and zeroing signals for these flip-flops.

For example, considering flip-flop B, it is apparent from inspection of Eq. 1 that in order to form the required signal $B_n$, flip-flop B must be set to its 1 state by an SB pulse whenever instruction 3 is present and signals A and K have different values, or when instruction 4 is present and signal K has a 1 value, or when any of instructions 0, 1, 2, 5, 6 or 7 is present and signal A has a 1 value. Conversely flip-flop B must be set to its 0 state by a ZB pulse whenever instruction 3 is present and signals A and K have the same values or when instruction 4 is present and signal K has a 0 value, or when any of the instructions 0, 1, 2, 5, 6 or 7 is present and signal A has a 0 value. Restating this in the form of Boolean equations, there is obtained:

$$SB=Cl[(AK'+A'K)(3)+K(4)+A(0+1+2+5+6+7)] \quad (4)$$

$$ZB=Cl[(AK+A'K)(3)+K'(4)+A'(0+1+2+5+6+7)] \quad (5)$$

The quantities $Cl$ in Eqs. 4 and 5 indicate that the signals SB and ZB are to be formed at the time when clock pulses $Cl$ are applied.

The corresponding equations for SO and ZO, and ZB and ZK may be similarly derived and are presented below.

$$SO=Cl[K(5)] \quad (6)$$

$$ZO=Cl[K'(5)] \quad (7)$$

$$SK=Cl[1(7)+A(6)+I(5)] \quad (8)$$

$$ZK=Cl[A'(1+3)+A(2)+I'(5)] \quad (9)$$

Although as noted above, Equations 6 and 7, and 8 and 9, may be directly written by inspection of overall Equations 2 and 3, it is advantageous for purpose of greater clarity to also briefly present the well known rote procedure by which these setting and zeroing equations may be obtained from their corresponding overall equations.

In the first step of such a procedure, unreduced setting and zeroing equations are written in the following manner: Each term of a setting equation is made identical to the same term of the corresponding overall equation. Each term of a zeroing equation is written as the complement (logical negative) of the same term (excluding instruction signals) of the corresponding overall equation.

Thus from the overall Equations 2 and 3 there are obtained the following corresponding unreduced zeroing and setting Equations 6′ and 7′, and 8′ and 9′ respectively.

$$SO=Cl[K(5)+O(5')] \quad (6')$$

$$ZO=Cl[K'(5)+O'(5')] \quad (7')$$

$$SK=Cl[AK(1+3)+A'K(2)+(A+K)(6)+1(7)+K(0+4)+I(5)] \quad (8')$$

$$ZK=Cl[(A'+K')(1+3)+(A+K')(2)+A'K'(6)+O(7)+K'(0+4)+I'(5)] \quad (9')$$

In the second step of this rote procedure the setting and zeroing equations are reduced by applying certain reduction rules which utilize to advantage the inherent logical memory and feedback operations which occur within the flip-flop utilized. Since any of the described type of flip-flops, generically designated as flip-flop Q, will remain in its 1 or 0 state without application of an input signal, it is clear that it is unnecessary to set the flip-flop if it is already in its 1 state, or to zero the flip-flop if it is already in its 0 state. Thus in a set Q (SQ) equation, any signal Q appearing may be made equal to 0 (thus eliminating the corresponding redundant term); while similarly in a ZQ equation, any signal Q′ appearing may be made equal to 0.

Also since a flip-flop Q will not be disturbed by a setting (SQ) signal or a zeroing (ZQ) signal, if it is already in its 1 or 0 state respectively, it is clear that such redundant signals need not be suppressed, but can be allowed to reach the flip-flop. Moreover, since the flip-flop triggers (reverses state) in response to simultaneous application of setting (SQ) and zeroing (ZQ) signals, it is clear that any redundant signal allowed to reach one input of a flip-flop, will not interfere with the flip-flops response to a correct signal simultaneously applied to the other input of the flip-flop. Therefore in an SQ equation, any signal Q′ occurring may be made equal to 1 (thereby simplifying the corresponding term and allowing a redundant SQ signal to be transmitted whenever Q′=0); while similarly in a ZK equation, any signal Q appearing may be made equal to 1.

The reduction rules thus obtained are as follows:

In an SQ equation—let Q=0
let Q′=1
In a ZQ equation— let Q′=0
let Q=1

Applying these well known reduction rules to Equations 6′ and 7′, and Equations 8′ and 9′ there is obtained:

let O=0, O′=1
$$SO=Cl[K(5)+\underline{O(5')}] \quad (6'')$$

let O′=0, O=1
$$ZO=Cl[K'(5)+\underline{O(5')}] \quad (7'')$$

let K=0, K′=1
$$SK=Cl[\underline{AO}(1+3)+A'O(2)+(A+O)(6)+1(7)+O(0+4+I(5)] \quad (8'')$$

let K′=0, K=1
$$ZK=Cl[(A'+\underline{O})(1+3)+(A+\underline{O})(2)+A'O(6)+O(7)+O(0+4)+I'(5)] \quad (9'')$$

Completing the reduction of these equations by eliminating all terms which have been reduced to 0 (each such term has been underlined), there is obtained Equations 6, 7 and 8, and 9, as presented hereinabove, thus verifying Equations 6, 7 and 8, 9. Equations 4 and 5 may of course be similarly verified.

Eqs. 4 through 9 may be rewritten in revised form by substituting therein for the various numerical instruction designations, the appropriate values of signals $P_1$, $P_2$ and $P_3$, as obtained from inspection of Table 2. The revised equations are:

$$SB=Cl[(AK'+A'K)(P'_3P_2P_1)+K(P_3P'_2P'_1)+A(P_3+P'_2+P'_1)(P'_3+P_2+P_1)] \quad (4a)$$

$$ZB=Cl[(AK+A'K')(P'_3P_2P_1)+K'(P_3P_2'P_1')+A'(P_3+P'_2+P'_1)(P'_3+P_2+P_1)] \quad (5a)$$

$$SO=Cl[K(P_3P'_2P_1)] \quad (6a)$$

$$ZO=Cl[K'(P_3P'_2P_1)] \quad (7a)$$

$$SK=Cl[P_3P_2P_1+A(P_3P_2P'_1)+I(P_3P'_2P_1)] \quad (8a)$$

$$ZK=Cl[A'(P_1P'_3)+A(P'_3P_2P'_1)+I'(P_3P'_2P_1)] \quad (9a)$$

Gating networks 52, 54 and 55 as shown in FIG. 1 are mechanized in strict accordance with Eqs. 4*a* and 5*a*, 6*a* and 7*a*, and 8*a* and 9*a*, respectively.

In the mechanizations of networks 52, 54 and 55 each "and" function shown in the equations is mechanized in conventional manner by a corresponding diode "and" gate (represented by a semicircle with a dot therein) while each "or" function is mechanized by a corresponding diode "or" gate (represented by a semicircle with a plus symbol therein). Since the complementary signal I′ is required by Eq. 7*a*, it is generated, from signal I, by an inverting amplifier 60 provided within storage and combining circuit 16. It is clear, from a consideration of FIG. 1 that there is a one-to-one correspondence between the terms of Eqs. 4*a* and 5*a*, 6*a* and 7*a*, and 8*a* and 9*a* and the corresponding structure of gating networks 52, 54 and 55.

Inasmuch as Eqs. 4*a* and 5*a*, 6*a* and 7*a*, and 8*a* and 9*a*, have been directly derived from the operational requirements set forth in Table I, the fact that gating networks 52, 54 and 55 are mechanized in strict accordance with these equations provides assurance that the computer will indeed operate, in response to applied program instructions, in the way designated in Table 1.

The above-described structure of circuits 12, 14 and 16 may of course be modified in many ways in accordance with the invention, as will be apparent to those skilled in the art.

For example it will be apparent to those skilled in the art, that in the present embodiment of the invention flip-flop B is utilized within circuit 12 only for the purpose of providing precise reclocking and synchronization of signals being recorded in the information channel. Since each new value of signal B depends only on the value of signals K and A and does not depend on the previous value of signal B, it is apparent that flip-flop B is not being utilized to perform any logical operations and may therefore be eliminated. This could be done for example, by replacing the present combination of flip-flop B and network 52 by a modified gating network, mechanized in accordance with Eq. 1 to directly form signal B.

Similarly it is clear, that flip-flop O is being utilized within circuit 14 to form output signals of relatively long duration to which slow acting output devices can adequately respond. It is therefore clear that flip-flop O may be replaced by any suitable "pulse-stretching" circuit—or if output devices are utilized which can respond to short pulses, flip-flop O together with network 54 may be entirely eliminated and output pulses derived directly (from flip-flop K as will hereinafter appear).

Storage and combining circuit 16 may also be modified in many ways as for example by provision of different apparatus (other than flip-flop K) for storing a single bivalued signal and of different apparatus (other than the cooperative arrangement of flip-flop K and network 55) for combining the stored signal with the signal emerging from the information channel (as signal A) in accordance with the program instructions.

A detailed explanation will now be provided of the manner in which the present embodiment of the computer of the invention is adapted for forming the desired output signals under the control of appropriately arranged program instructions.

As a preliminary to this explanation, it should be stated that each of the output signals produced by the computer of the invention is defined as a Boolean function of many variables, these variables being the values of the values of certain of the input signals and certain auxiliary signals.

As a preliminary to this explanation, the nature of the output signals which are formed by the computer to control pallet loader 5 and their relationship to the input signals, will be clarified.

For the purposes of control of pallet loader 5, the present condition of the pallet loader is sufficiently specified by the values of the input signals which are formed by sensing devices on the pallet loader, by the values of the output signals which are being applied to the pallet loader, and by the values of a number of auxiliary signals which are formed by the internal operations of the computer. The input signals, as hereinbefore explained, directly represent the present conditions of various sensing devices on the pallet loader. The output signals of course control and therefore represent the conditions of the various actuators utilized in the pallet loader. The auxiliary signals, in the present embodiment of the invention, represent for the most part the results of various counts which are made, as for example, count of the number of boxes which have entered the pallet loader and of the number of layers which have been stacked onto a pallet.

It will be shown hereinbelow that each output signal required for the control of pallet loader 5 may be defined by an appropriate Boolean equation as a Boolean function of many variables; namely as a function of certain of the input signals and often some of the output signals and auxiliary signals. Each of the auxiliary signals may be similarly defined.

At a later point in the specification the Boolean equations defining the various output signals and auxiliary signals will be developed from a consideration of the desired operation of pallet loader 5, and will be presented in Table 3. At this point however for purposes of exemplification of the operation of the computer, two of these equations are now presented, without further justification, these being the equations defining the output signal $M_{ed}$ and an auxiliary signal $r$.

$$M_{ed}=r(s_oS_o+e_oE'_d+M_{ed}P'_2)$$

$$r=r(O'_iO'_lO'_rO'_sO'_eO'_w)\underline{stop}'(R'_b+M_i+P_1)(E'_d+P_2)(M'_w+W'_1+e_o+stop')+start$$

wherein these equations, signals $S_o$, $E_d$, $P_2$, $O_i$, $O_l$, $O_r$, $O_s$, $O_e$, $O_w$, $\underline{stop}$ $R_b$ and $P_1$ are input signals, signals $M_{ed}$ and $M_i$ are output signals, and the signals $s_o$, $e_o$, and of course $r$ are auxiliary signals.

It is seen from the equations provided above that output signal $M_{ed}$ is defined as a Boolean function of seven variables (represented by signals $r$, $s_o$, $S_o$, $e_o$, $E_d$, $P_2$ and the previous signal $M_{ed}$). Auxiliary signal $r$ is similarly defined, it is seen, as a function of eighteen variables.

The basic function of the computer of the invention is to form each of the output signals and each of the auxiliary signals in accordance with its defining equation. To accomplish this, in the present embodiment of the computer of the invention all of the signals required in the formation of the output signals and auxiliary signals are in the operation of the computer stored in known or predetermined cells of the information channel, and thus are serially read again and again during successive turns or recirculations of the information channel. These stored signals, as they are read, are selectively operated upon in accordance with simultaneously presented program instructions, so as to combine the signals one by one with each other to build up, by a step-by-step process, the required output signals and auxiliary signals.

For example, as will be later shown in detail, the output signal $M_{ed}$ is formed in accordance with its defining equation by the following steps:

First, a 1-valued signal is stored in flip-flop K. Second, when the previous signal $M_{ed}$ is read from the information channel it is copied into the K flip-flop by combining it with the signal (1) stored in K in accordance with the logical "and" operation to form and store in K the signal $M_{ed}.1$ which is of course identically equal to $M_{ed}$. Third, when signal $P_2$ is read from the information channel, it is complementarily combined with the signal stored in K in accordance with the logical "and" operation to form and store in K a signal $M_{ed}P'_2$. Fourth, the signal $M_{ed}P'_2$ thus formed in flip-flop K, is recorded in a predetermined cell of the information channel.

In the same way, the signals $s_o$ and $S_o$ are later combined to form a signal $s_oS_o$ in the flip-flop K, the signal $s_oS_o$ then being recorded in the information channel.

The signals $e_o$ and $E_d$ are similarly combined to form and store in K a signal $e_oE'_d$.

With the signal $e_oE'_d$ thus stored in K, the signal $M_{ed}P'_2$ (which was earlier formed and stored in the information channel), is read back from the information channel and combined with the signal stored in K in accordance with the logical "or" operation to form and store in K a signal $e_oE'_d+M_{ed}P'_2$.

Then the signal $s_oS_o$ (which was also earlier formed and stored in the information channel) is read back and similarly combined in accordance with the logical "or" operation to form and store in K a signal $$s_oS_o+e_oE'_d+M_{ed}P'_2$$

Finally the signal $r$ is read from the information channel and combined in accordance with the logical "and" operation, with the signal stored in K to form in K the signal $$r(s_oS_o+e_oE'_d+M_{ed}P'_2)$$

this being the new signal $M_{ed}$.

Thus, by the above-described step-by-step sequence of operations the new signal $M_{ed}$ is formed in flip-flop K. In succeeding operations the new signal $M_{ed}$ is recorded in its appropriate cell in the information channel (thus replacing the old value of signal $M_{ed}$) and is also later transferred at an appropriate time to output flip-flop O, so as to apply the new output signal to pallet loader 5.

Each operation in the above-described sequence of operations is ordered by a corresponding instruction which is presented by the program channel at the time that the signal being operated upon is read from the information channel.

It is clear that the above-described sequence of operations for the formation of signal $M_{ed}$ may be performed in approximately two recirculations or turns of the information channel, since the intermediately formed signals $s_oS_o$ and $M_{ed}P'_2$ may be formed and recorded in the information channel during one recirculation and be read back from the channel and combined during the next recirculation. In the present embodiment of the invention, as will appear hereinbelow, formation of signal $M_{ed}$ is accomplished in approximately 1¾ turns of the information channel.

Figure 4:
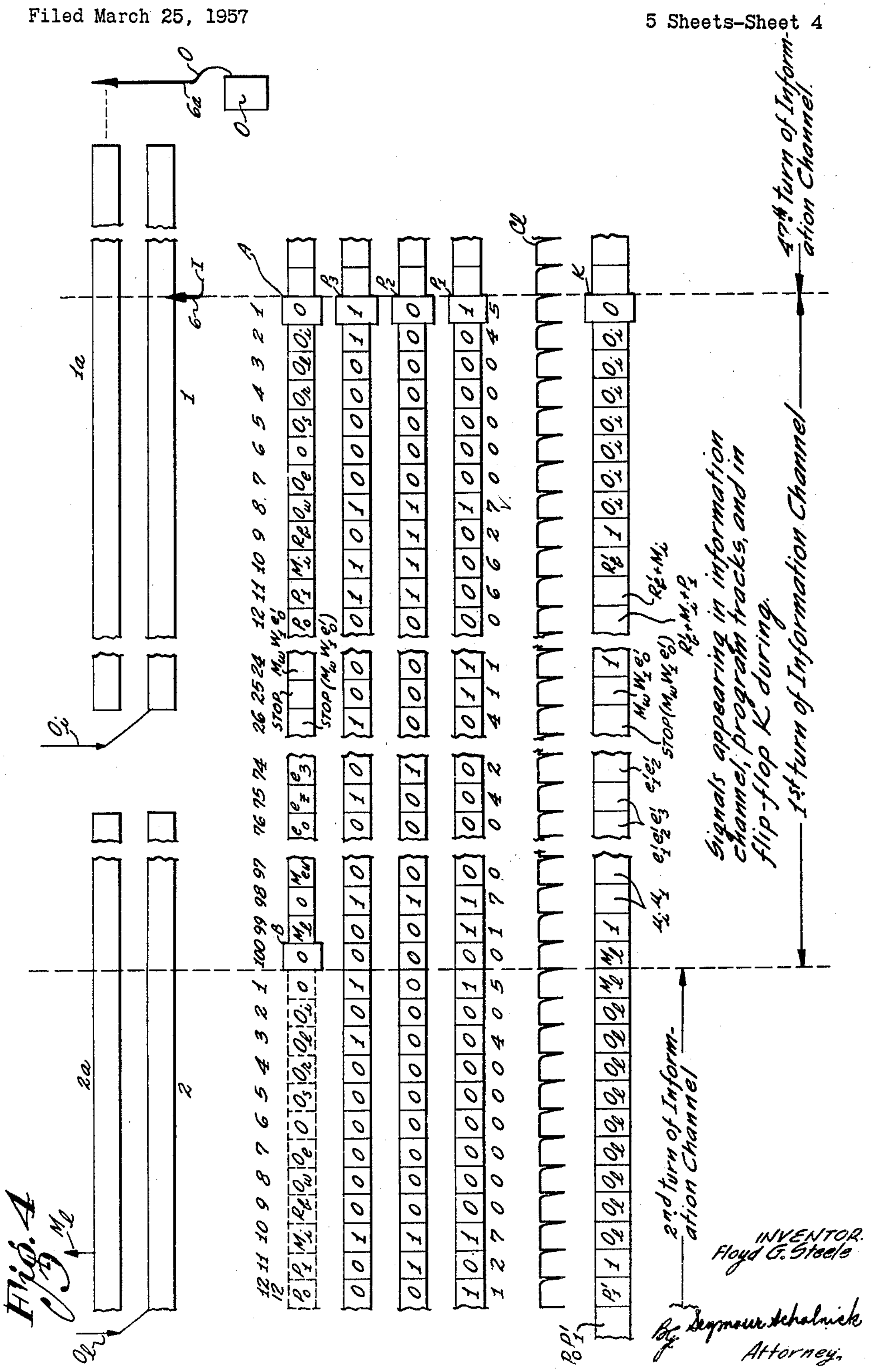
FIG. 4 is both a cell structure and flow diagram, and presents the contents of the cells of the information (short) channel, the cells of the program channel, and of flip-flop K, as they appear during the first and second recirculations of the information channel.

The manner in which such operations are preformed upon signals of the information channel in response to simultaneously presented program instructions will be greatly clarified by referring now to FIG. 4, wherein is shown a flow diagram illustrating from right to left on a common time scale (as demarked by timing pulses *Cl*) the information signals which will be read from the information channel (as signal A) and the program signals which will be read from the program tracks (as signal $P_1$, $P_2$ and $P_3$) during the first recirculation and a portion of the second recirculation (turn) of the information channel. Since each combination of three simultaneously appearing program signals represents a corresponding instruction, for purposes of convenient reference the numerical designation of each instruction has been supplied beneath the corresponding program signals. The successive signals which will appear in flip-flop K during these turns of the information channel are also indicated in FIG. 4.

Alternatively FIG. 4 may be thought of as displaying, with some gaps because of space limitations, the contents of the 100 cells of the information during the first turn and the contents of 12 cells during the first portion of the second turn of the information channel. The corresponding contents of the first 112 cells of the program tracks are also displayed.

In addition, the corresponding commutator segments 1 and 1*a* and 2 and 2*a* are shown in FIG. 4, brushes 6 and 6*a* being shown at the positions they have at that time (during the first turn) that the first cell of the informaion channel is being read. It is clear from a consideration of FIG. 4, that brush 6 makes a central contact with segment 1 at that time, thereby connecting input signal $O_i$ to conductor I, while brush 6*a* is in an intermediate position between segment 47*a* and 1*a* (so that it will contact segment 1*a* at about the time that cell 25 is read). Each of the other segments 2–47 and 2*a*–47*a*, it will be understood, is similarly positioned, so as to be contacted by brushes 6 and 6*a* at approximately the same relative times during successive recirculations of the information channel.

A number of operations relating to the formation of signal *r* are performed during the first turn of the information channel, and may now be described in detail.

As shown in FIG. 4, the signals stored in cells 1–12, 24–26, 74–76 and 97–100 of the information channel are the signals O, $O_i$, $O_l$, $O_r$, $O_s$, O, $O_e$, $O_w$, $R_b$, $M_i$, $P_l$, $P_0$ and $M_wW_1e'_o$, Stop, $\text{Stop}(M_wW_1e'_o)$ and $e_3$, $e_z$, $e_o$ and $M_{eu}$, O, $M_l$, O, respectively. The gaps in this presentation, may be filled in by reference to Table 4, wherein the contents of each of the 100 cells is shown. The cells in the information channel containing unnamed 0-valued signals are spare cells, which are not utilized in the present computation.

Operation upon the signals in the information channel will be considered to begin at the time that the 0-valued signal in cell 1 is being read (as signal A as indicated by the box or window so labeled). At this time, a 0-valued signal is stored in flip-flop K. In addition, the program signals 1, 0, 1 are being read from the program tracks (as signals $P_3$, $P_2$, $P_1$, respectively indicating that the operations to be performed are those designated by instruction 5, the Read In-Out instruction.

Accordingly, at the end of the timing interval (designated timing interval 1) in which cell 1 is read, as directed by instruction 5, the 0-valued signal read from cell 1 is transferred to flip-flop B so as to be re-recorded in cell 1 without change. At the same time, the 0-valued signal in K is copied into flip-flop O, for later application as an output signal to segment 1*a* (not used), and simultaneously input signal $O_i$ (appearing as signal I) is copied into flip-flop K. In this way the signal in K is read-out as an output signal to the next appearing output segment 1*a* (although not here used), while the latest value of input signal $O_i$ is read-in from input segment 1 into flip-flop K, and is thus available there while cell 2 is read.

The reading of cell 2, which contains the previous value of signal $O_i$ is accompanied by the presentation of instruction 4 ($P_3=1$, $P_2=0$, $P_1=0$) the Copy instruction which directs that the signal in K is to be recorded in the information channel. Thus at the end of the second timing interval, in response to instruction 4, the new value of signal $O_i$ (in K) is copied into flip-flop B to be recorded in cell 2. In this way the latest value of input signal $O_i$ is entered into its proper cell (cell 2) of the information channel, replacing the previous stored value of signal $O_i$.

Since the Copy instruction does not change flip-flop K, the signal $O_i$ remains therein. During the reading of cells 3–7 the Do-Nothing instruction 0, is presented so that as a result, signal $O_i$ remains in K and the signals $O_l$, $O_r$, $O_S$, O, and $O_e$ are recirculated without change in the information channel.

With the reading of cell 8, instruction 7, the Set K instruction is presented and in response thereto a 1-valued signal is stored in K. Signal $O_w$ in cell 8 is recirculated without change.

The storing of the 1-valued signal in K marks the beginning of the formation of the quantity $$\underline{\text{stop}}'(R'_b+M_i+P_l)$$

which appears in the equation presented hereinabove, for auxiliary signal *r*. The formation of this quantity is partially shown in FIG. 4. During the reading of cells 9, 10, and 11 containing signals $R_b$, $M_i$ and $P_l$ respectively, instructions 2, 6 and 6 are presented. In response to instruction 2, the signal $R'_b$ (actually $R'_b \cdot 1$) is formed and stored in K, representing the logical product of the complement ($R'_b$) of the signal read from the information channel and the signal (1) stored in K. In response to instruction 6, the signal $R'_b+M_i$ is formed and stored in K, representing the logical sum of the signal read ($M_i$) and the signal ($R_b$) stored in K. In response to the next instruction 6, the signal $R'_b+M_i+P_l$ is formed and stored in K, representing the logical sum of the signal read ($P_l$) and the signal ($R'_b+M_i$) stored in K.

In continuing operations, not shown in FIG. 4 because of space limitations, the signal $R'_b+M_i+P_l$ which has been formed in K is left unchanged (in response to successive Do-Nothing instructions) until cell 14 is read, in which a signal $\underline{\text{Stop}}$ is stored. Then in response to a simultaneously presented Decode instruction, instruction 1) the signal $\underline{\text{Stop}}(R'_b+M_i+P_l)$ is formed in K. Immediately thereafter in response to a Copy instruction, instruction 4 the signal $\underline{\text{Stop}}(R'_b+M_i+P_l)$ is recorded in cell 15, so that it will be available there during succeeding turns of the information channel to be utilized in a later formation of signal *r*.

These above-described operations which are not shown in FIG. 4 because of space limitations, are shown in detail in Table 4 provided hereinbelow wherein are similarly displayed the complete contents of the 100 cells of the information channel and all of the 4700 instructions that are applied thereto during successive recirculations of the information channel. The omissions in FIG. 4 may be filled in by reference to Table 4.

Referring again to FIG. 4, with the reading of cell 24, a very interesting sequence of operations begins, which is associated with the formation of the quantity $$(\text{Stop}'+M'_w+W'_1+e_o)$$

which appears in the equation for auxiliary signal *r*. This quantity is formed in an unusual way. During Turn 1 the quantity Stop $M_wW_1e'_o$ is formed and stored in the information channel. In a later turn, turn 8, it is read back from the information channel in complemented form (using the Decode Prime instruction, instruction 2). Since the complement of (Stop $M_wW_1e'_o$) is equal to (Stop'$+M'_w+W'_1+e_o$) the required quantity is thus formed. This sequence of operations avoids any necessity of separately complementing the signals involved before summing them to form the required quantity.

However only the beginning of this sequence of operations is shown in FIG. 4. During the reading of cells 24 and 25 containing a previously formed signal $M_wW_1e'_o$ and the signal Stop respectively, instructions 1 and 1 are presented. During the reading of cell 24, flip-flop K has a 1-valued signal therein (occasioned by a previous Set K instruction). In response to the first Decode instruction 1, the signal $M_wW_1e'_o$ is formed in K, representing the logical product of the signal read and the signal (1) in K. In response to the second Decode instruction 1 the signal Stop $M_wW_1e'_o$ is formed in K. When cell 26 is being read, in response to Copy instruction 4, the signal Stop $M_wW_1e'_o$ is recorded in cell 26 for later use in the manner described.

The remaining operations which are shown in FIG. 4 are not of great interest at this time. Briefly, during reading of cells 74 and 75, the formation of an auxiliary signal $e_z$ (where $e_z = e'_1e'_2e'_3$) is completed and the auxiliary signal $e_z$ is recorded in cell 75. During reading of cell 76, the Do-Nothing instruction is presented. A number of operations are carried on during reading of cells 77–96 but are not shown in FIG. 4. During the reading of cell 97 the Do-Nothing instruction is presented.

During reading of cells 98, 99 and 100, the output signal $M_l$, which is stored in cell 99 is copied into flip-flop K, in preparation for read-out of output signal $M_l$ to segment 2*a* during the next (second) turn of the information channel.

During that portion of the second turn of the information channel which is shown in FIG. 4, the output signal $M_l$, which has been formed in K is transferred (read-out to flip-flop O for application to segment 2*a*, and also the input signal $O_l$ is read into K (instruction 5) and later recorded in cell 3 (instruction 4).

Thereafter nothing is done until cell 10 is read, when formation of the quantity $P_0P'_1$ begins in the way that has now become familiar.

The extension of varied operations upon the signals in the information channel over many turns of the channel makes it difficult to visually present related operations. A compact notation has been developed which is of great assistance and is utilized immediately below to present in more detail the related operations involved in the formation of output signal $M_{ed}$ and the reading-out of the signal from the computer.

The form of the tabulation provided above, follows closely that used in FIG. 4. Each of the signals involved in forming signal $M_{ed}$ has the number of its cell location written therebefore. The formation and reading-out of new signal $M_{ed}$ takes place during the end of turn 17 and throughout turns 18 and 19. In each turn are listed the pertinent instructions which are applied to these signals and the resultant signals formed in flip-flop K. Any new signals recorded in the information channel during a turn, are listed in the appropriate cell position in the next turn.

Following now these operations, as hereinbefore explained, first the signal $M_{ed}P'_2$ is formed in K and recorded in the information channel (in cell 21 as shown above). Then signal $s_oS_o$ is formed in K and also recorded in the channel (in cell 68). Then the signal $e_oE'_d$ is formed in K and during turn 19 is combined with the recorded signals $M_{ed}P'_2$, $s_oS_o$, and $r$ to form the required new value of output signal $M_{ed}$ which is recorded in its proper cell, cell 95 of the information channel, replacing the previous value of $M_{ed}$. The new value of output signal $M_{ed}$ is also retained in K, and is read-out to flip-flop O at the same time (corresponding to reading of cell 99) that input signal $W_1$ is read-in to flip-flop K.

It is apparent from the examples provided hereinabove, that the computer of the invention has great versatility and mathematical power. As has been shown, through the use of the above-described elementary instructions, logical sums of signals and logical products of signals may be formed at will.

Also it has been shown, particularly in the example provided of the formation of signal $M_{ed}$, that sums of products may also be readily formed. This is of great significance, for there is a well-known theorem of logical algebra which states that any Boolean function of any number of variables can be expressed as a sum of products (or product of sums). Thus the above examples have in a sense provided a proof that the computer of the invention can, within its space limitations, form any Boolean function of any number of variables. The digits of numbers can be expressed as such Boolean functions, so that it is clear that all numerical operations can be performed by the computer of the invention. The numerical operations of counting (adding 1) and addition of numbers are utilized in the control of pallet loader 5 and will appear hereinbelow. In fact, very nearly all computable quantities are expressible in terms of such Boolean functions and may therefore be successfully calculated by the computer of the invention.

To increase the power of the computer it is only necessary to increase the length of the information channel so that more variables can be accommodated therein and to

*Tabulation*

| Cell | Turn 17 | | | Turn 18 | | | Turn 19 | | | |
|---|---|---|---|---|---|---|---|---|---|---|
| | Signal | Instruction | K | Signal | Instruction | K | Signal | Instruction | K | |
| 17 | $E_d$ | | | | | | | 2 | | |
| 18 | $P_2$ | | | | 2 | | | | $e_oE'_d$ | |
| 19 | | | | | | $M_{ed}P'_2$ | | | | |
| 21 | | | | | 4 | | $M_{ed}P'_2$ | 6 | | |
| 22 | | | | | | | | | $e_oE'_d+M_{ed}P'_2$ | |
| 31 | | | | | 7 | | | | | |
| 32 | $S_o$ | | | | 1 | 1 | | | | |
| 33 | | | | | | $S_o$ | | | | |
| 67 | $s_o$ | | | | 1 | | | | | |
| 68 | | | | | 4 | $s_oS_o$ | $s_oS_o$ | 6 | | |
| 69 | | | | | | | | | $s_oS_o+e_oE'_d+M_{ed}P'_2$ | |
| 75 | | | | | 7 | | | | | |
| 76 | $e_o$ | | | | 1 | 1 | | | | |
| 77 | | | | | | $e_o$ | | | | |
| 94 | $r$ | 7 | | | | | | 1 | | |
| 95 | $M_{ed}$ | 1 | 1 | | | | | 4 | $M_{ed}$ | $M_{ed}$ |
| 96 | | | $M_{ed}$ | | | | | | | |
| 99 | | | | | | | | 5 | | |
| 100 | | | | | | | | | $W_1$ | &$M_{ed}\rightarrow O$ |

increase the length of the program tracks so that a longer sequence of stored instructions can be applied to these signals during successive recirculations of the information channel. Thus, for example, in a more expanded version of the computer of the invention, the information channel may extend entirely around the drum, and the program tracks may be provided as spiral tracks wound around and around the drum. Any other mechanism which provides a synchronized information loop and a longer program loop may also be utilized.

It will be recognized, that to a very large extent, the great mathematical power of the computer of the invention depends upon the fact that it is adapted for repetitively operating upon the signals stored in the cells of the information channel, in accordance with many different sequences of a few elementary instructions presented during corresponding recirculations of the information channel, it being understood that each sequence comprises a series of as many instructions as there are signals to be operated upon, each instruction designating an operation to be performed upon the corresponding signal.

For example, in the present embodiment of the computer of the invention, there are 100 signals stored in the 100 cells of the information channel and during each cycle of operation of the computer, the information channel is recirculated 47 times, a new sequence of instructions being presented at each recirculation of the information channel, and the computer operating upon the stored signals at each recirculation in accordance with the corresponding 47 sequences of instructions. As will be shown hereinbelow, in the present embodiment of the computer, to provide for progressive operations upon the signals of the information channel, all of the 47 sequences of instructions are different from each other. Thus in the present embodiment of the invention, a different sequence of operations is performed upon the signals in the information channel at each recirculation thereof, to progressively combine these signals in different groupings to thereby form the required output signals and auxiliary signals.

In the more general case, it is clear that all instruction sequences need not be different. For example if it is desired that some output signals be formed at a more rapid rate than once per turn of the program tracks, the instructions relating to the formation of those output signals may be repeated at equal intervals. However, it is equally clear that in accordance with the basic principles of the invention, to accomplish useful progressive operation upon the signals in the information channel, many different instruction sequences must be provided. For relatively simple problems, such as the control of pallet loader 5, 20 to 100 different program sequences will be sufficient. For increasingly more complex problems, the number of different instruction sequences required will increase to several thousand. It appears that a solution of practically useful problems cannot be accomplished without provision of at least 10 different instruction sequences.

As stated hereinbefore, the number and significance of the instructions mechanized in the present embodiment of the invention, are more than sufficient to allow generalized computation and may be readily reduced or modified. For example, the Set K instruction can be eliminated since a 1 may always be formed in K by forming the logical sum of a signal and its complement (since in Boolean algebra $A+A'=1$). The Count (logical difference) instruction may also be eliminated since it is not required for forming sums of products.

It is preserved however, because it greatly speeds up numerical calculations since the mathematical (numerical) sum of two binary digits is equal to their logical difference.

More generally however, any set of elementary functions can be utilized which will permit generalized formation of Boolean functions of many variables. Logical product and complements is such a set functions, as are logical sum and complement, logical difference and logical product, and a number of other sets.

In general the functions of a sufficient set may be applied in any order to the formation of the signal in K and the formation of the signal to be recorded in the information channel. For example in one simple modification of the computer of the invention logical sums might be formed only in flip-flop B thus immediately recording each logical sum, while logical products would be formed in flip-flop K. A sum of many products would then be formed by summing each product, after it is formed in K, into the same cell in the information channel. In this way the final signal in that cell would represent the sum of the applied products.

This above-described modification however would be comparatively slow since one full recirculation of the information channel would be required for each product to be summed, whereas in the present embodiment many products may be formed in K and deposited (recorded) in the information channel during one recirculation, and then summed in K in one additional recirculation. Moreover flip-flop K is freed for other operations, after each recording of a product.

It is also apparent that the effective speed of the computer may readily be increased, roughly doubled, by providing an additional flip-flop (this might be flip-flop O, borrowed when not needed for output operations) since then products formed in K could be immediately summed in the additional flip-flop, allowing formation of a sum of many products in a single turn of the information channel.

The manner in which the present embodiment of the computer of the invention operates to control pallet loader 5 will now be explained in detail. From a consideration of the desired mode of operation of pallet loader 5. Boolean equations will be derived defining each of the output signals, required for control of pallet loader 5, and each of a number of auxiliary signals which are internally generated in the operations of the computer. After these equations have been derived, the operations performed by the computer in forming each of these output signals and auxiliary signals in accordance with their defining equations will be fully presented.

Referring now again to FIG. 3, as before explained there is shown a suitable form of pallet loading apparatus, hereinbefore designated as pallet loader 5, which is operable in response to appropriate control signals for receiving boxes of merchandise, stacking these boxes on wooden pallets in a predetermined stacking pattern, and withdrawing fully loaded pallets from the machine. As shown in FIG. 3, pallet loader 5 is generally similar in its mechanical details to the palletizer described in U.S. Patent 2,633,251, entitled "Palletizer," by John K. Bruce, issued March 31, 1953.

As illustrated in FIG. 3, boxes are introduced into pallet loader 5 in alignment, that is, proceeding endwise on an input conveyor belt 100. Conveyor belt 100 is driven at uniform speed by a motor, designated as input motor 80, and will be understood to be the last of a series of successively higher speed input belts which are also driven by input motor 80 (through suitable gearing not shown). The series of successively higher speed belts has the effect of spreading apart or separating entering boxes, this being desirable in the operation of the pallet loader to facilitate counting of entering boxes. Entrance of boxes may be halted, by stopping input motor 80.

Entering boxes pass from input belt 100 to a split line belt 101, which is driven by a motor 81, designated as line motor 81, and after being suitably aligned by an aligning bar 102, the boxes are either allowed to pass unchanged (endwise) or are turned sidewise in accordance with the dictates of the stacking pattern.

Turning of a box is effected by protruding a turning pin 103 through the split line belt so as to arrest the oncoming box near one corner thus causing the box to rotate around the pin until the box assumes a sidewise position and is then free to again move forward on line belt 101. Turning pin 103 is protruded, when required, by energization of a driving solenoid 83.

Each entering box is counted by a photocell 104, which observes interruption by the box, of light emitted by a light source 105. Entering boxes proceed past the photocell, and towards a barrier 106. The first box of a row or line is stopped by this barrier and each succeeding box of a line lodges against its predecessor. The line belt continues to run and slips under all of these boxes so that they are compacted longitudinally.

When a line is completed, as determined by a count maintained of the entering boxes, a ram 107 is moved out across line belt 101 to shove the entire line of boxes sideways off the belt and onto a thin steel "stripper" plate 108 beside it which serves as a loading platform. At the same time input motor 80 is momentarily stopped, to prevent further boxes entering until the completed line has been rammed and ram 107 returns from its extended or "out" position to its normal "back" position (as shown in FIG. 3). Input motor 80 is thus directed to start again when the ram returns to its back position. Ram 107 is driven out and back by a reversible ram motor 87 through a rack and pinion coupling. The extreme "out" and "back" positions of ram 107 are detected by limit switches, to be shown hereinbelow.

The described process for forming a line and ramming it onto stripper plate 108 is repeated until enough lines have been rammed to form a complete layer (as shown in FIG. 3).

When a layer is completed, stripper plate 108 is drawn or stripped from under the boxes of the completed layer, by withdrawing it horizontally underneath another barrier 109 (as shown in FIG. 3) to an extreme "out" position. Directly beneath stripper plate 108 in an elevator well 110 are positioned a pair of vertically movable elevator slides 111 disposed on opposite sides of the well and supporting a pallet thereon. When the first layer of a stack is to be stripped, the elevator slides are positioned so that the top of the pallet is immediately beneath the stripper plate at almost zero clearance therefrom, so that as the stripper plate is withdrawn the boxes of the layer drop a fraction of an inch onto the pallet. Then, elevator slides 110 are lowered a distance just equal to the box height and stripper plate 110 is returned to its normal "back" position to receive the next layer. Each layer is in turn formed on stripper plate 108 in the same way and dropped onto the preceding layer. (For example as shown in FIG. 3, the first layer of a stack has previously been dropped on a pallet 112 held in slides 111, and a second layer is shown being dropped on the first layer.)

It will be noted in FIG. 3 that stripper plate 108 is driven back and forth between its extreme "out" position and its normal "back" position by a reversible stripper motor 88 through a rack and pinion coupling (not viewed). The extreme positions of the stripper plate are detected by a pair of limit switches to be shown hereinbelow. The elevator slides 111 are raised and lowered together on screws 113 which are driven in common by a reversible elevator motor 93.

The manner in which the top of a pallet or completed layer is positioned below stripper plate 108 at the proper clearance, differs from the hanger arrangement described by Bruce. As shown in FIG. 3, a photocell 114 is positioned so as to view a light beam (produced by a source not shown) which traverses a path immediately beneath stripper plate 108. When an empty pallet is to receive a first layer, it is moved up on elevator slides 111 and stopped when a projecting tab 115 on (the nearest) slide 111 interrupts the light beam, thus positioning the empty pallet immediately beneath stripper plate 108 at a predetermined clearance. After a layer has been dropped on the pallet, elevator slides 111 descend only until the light beam again illuminates photocell 114 above the top of the boxes of the descending layer. In this way each successive layer is positioned at the same clearance beneath the stripper plate, until the final layer of a stack is dropped thereon.

When the last layer of a stack is dropped on a pallet, the pallet bearing the completed stack is lowered on slides 111 down to the bottom of elevator well 10. The pallet being lowered lands upon a pair of normally stationary withdrawal chains 116, which are driven by a pallet withdrawal motor 96. The elevator slides 111 descend slightly further to an extreme "down" position, and in doing so triggers a suitable release mechanism (not shown) to cause one new pallet to be deposited on chains 116 from a pallet hopper or magazine, generally designated 117 wherein a large number of pallets stored. (A suitable release mechanism is shown in the aforesaid patent to Bruce.)

Thus as elevator slides 111 reach their extreme "down" position (detected by a limit switch to be shown hereinbelow) an empty pallet and a fully loaded pallet rest on chains 116. When the extreme "down" position is reached, pallet withdrawal motor 96 is started, causing the loaded pallet and the empty pallet to move outwards together at fixed spacing on chains 116, so that the loaded pallet is removed from the elevator well into an extended pallet dock generally designated 118, while the empty pallet enters the elevator well.

When the empty pallet is centered in elevator well 110 above elevator slides 111 (as detected by switches in a manner to be shown), pallet withdrawal motor 96 is stopped, and elevator slides 111 are then raised to pick-up the empty pallet and carry it to the top of the elevator well, to thus begin formation of a new stack.

It is seen that loaded pallets withdrawn onto pallet dock 118, will be moved stepwise in a spaced file on chains 116 and will be readily available there for removal by a fork truck.

Operation of the pallet loader is automatically stopped if the pallet dock becomes filled (as indicated by actuation of a limit switch 120 provided at the end of the pallet dock) or if pallet hopper 117 becomes empty (as indicated by a photocell 121 which views a light beam projected upwards from beneath pallet hopper 117). Operation is also stopped, whenever any of a large number of injurious conditions occur, as for example overloading of any of the motors, or failure of a light source. An alarm klaxon (shown hereinbelow) is also sounded when any of these conditions occur, to summon human assistance.

Figure 5:
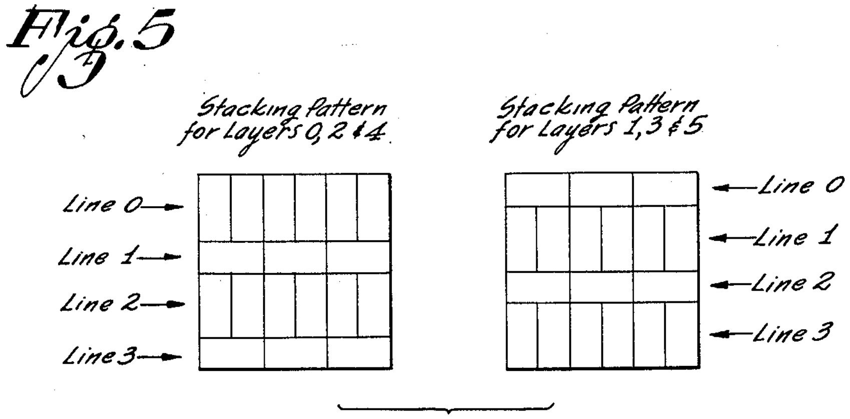
FIG. 5 is a diagram illustrating the stacking pattern to be used in the pallet loader.

Referring now to FIG. 5, there is illustrated the stacking patterns utilized in the present example of operation. It is assumed that entering boxes have a 2 to 1 ratio of length to width and are to be stacked 6 layers high (designated as layers 0, 1, 2, 3, 4, 5).

To prevent cleavage of successive layers along outer edges of a stack, the boxes are overlapped in the pattern shown in FIG. 5. In alternate layers 0, 2 and 4, lines 0 and 2 each contain six sidewise turned boxes and lines 1 and 3 each contain three unturned edgewise oriented boxes. In the remaining interleaved layers 1, 3 and 5, lines 1 and 3 each contain six sidewise turned boxes while lines 0 and 2 each contain three unturned boxes.

The manner in which this stacking pattern is established through selective actuation of solenoid 103 will be later described.

Figure 6:
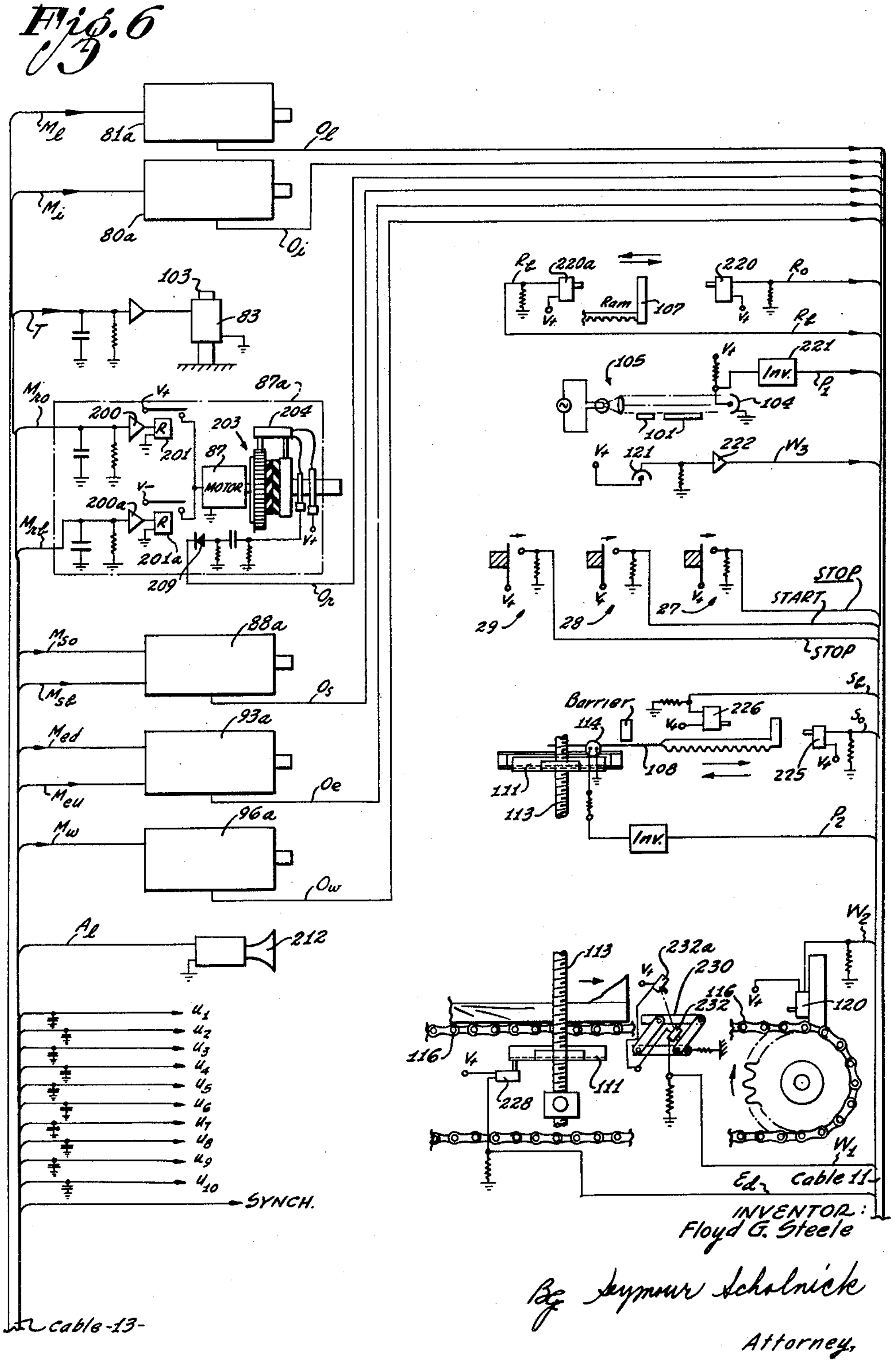
FIG. 6 is a complete circuit diagram of the electrical system of the pallet loader, as adapted for applying input signals to and receiving resultant output control signals from the computer shown in FIG. 1.

Referring now to FIG. 6, there is shown a diagram wherein is presented the complete electrical system of pallet loader 5, as adapted for providing desired input signals to the computer shown in FIG. 1 via input cable 11 and for responding to resultant output signals applied by the computer to pallet loader 5. In addition, the formation of the input signals $\overline{\text{Stop}}$, Start and Stop is shown, these signals being produced by corresponding manually operable switches 27, 28 and 29 positioned on control panel 20 shown in FIG. 1.

The names and significance of each of the various input and output signals is listed below. The significance ascribed is for the signal at its high (*l* representing) level. Each signal has the reverse significance when it is at its low level.

| Signal | Significance (when high) |
|---|---|
| $M_l$ | Indicates that line motor 81 is to be turned on. |
| $M_i$ | Indicates that input motor 80 is to be turned on. |
| T | Indicates that turning pin 103 is to be extended. |
| $M_{ro}$ | Indicates that ram motor 87 is to drive ram 107 out. |
| $M_{rb}$ | Indicates that ram motor 87 is to drive ram 107 back. |
| $M_{so}$ | Indicates that stripper motor 88 is to drive stripper plate 108 out. |
| $M_{sb}$ | Indicates that stripper motor 88 is to drive stripper plate 108 back. |
| $M_{ed}$ | Indicates that elevator motor 93 is to drive elevator slides 111 down. |
| $M_{eu}$ | Indicates that elevator motor 93 is to drive elevator slides 111 up. |
| $M_w$ | Indicates that withdrawal motor 96 is to run (loaded pallet being withdrawn and empty pallet being transferred into elevator well). |
| $u_1, u_2, \ldots u_{10}$ | The successive binary digits of a total maintained of the dollar value of completed pallets (calculated at $300 a pallet). |
| Synch | A signal supplied to synchronize transfer of signals $u_1 \ldots u_{10}$ to any suitable display device. |
| $O_l$ | Each of these is an overload signal, indicating that the corresponding motor (line, input, ram, stripper, elevator, or withdrawal motor) is being overloaded. |
| $O_i$ | |
| $O_r$ | |
| $O_s$ | |
| $O_e$ | |
| $O_w$ | |
| $R_o$ | Indicates that the ram is at its extreme out position. |
| $R_b$ | Indicates that the ram is at its extreme back position. |
| $P_1$ | Indicates that input photocell 104 is illuminated. |
| $W_3$ | Indicates that pallet hopper 117 is empty (photocell 121 illuminated). |
| Stop | Pushbutton emergency signal indicating that pallet loader 5 is to stop. |
| Start | Pushbutton signal indicating that pallet loader 5 is to start. |
| Stop | Pushbutton signal indicating that pallet loader 5 is to stop after the next completed pallet is withdrawn. |
| $S_b$ | Indicates that stripper plate is at its extreme back position. |
| $S_o$ | Indicates that stripper plate is at its extreme out position. |
| $P_2$ | Indicates that photocell 114 is illuminated (clearance between stripper plate and elevator). |
| $W_2$ | Indicates pallet dock is filled to capacity. |
| $W_1$ | Indicates pallet withdrawal is completed. |
| $E_d$ | Indicates elevator slides 111 are at their extreme down position. |

As indicated in FIG. 6, the various motors 80, 81, 87, 88, 93 and 96 are included in corresponding motor units designated 80*a*, 81*a*, 87*a*, 88*a*, 93*a* and 96*a*, respectively. All of these motor units may be essentially identical to motor unit 87*a*, which is shown in detail for purposes of example. Within unit 87*a*, signal $M_{ro}$ is applied to the input of an amplifier 200 whose ouput (when signal $M_{ro}$ is high) causes a relay 201 to connect a source of high voltage V+ to the motor coil to thereby drive the motor in one direction (the ram-out direction); while signal $M_{rb}$ is similarly effective, through an amplifier 200*a* and relay 201*a* for connecting a source of low voltage V− to the motor coil to drive the motor in the opposite (the ram back) direction. It is clear that if neither of the applied signals is high, motor 87 will stop. As shown, motor 87*a* is coupled to its output shaft through a slip type overload clutch generally designated 203, and apparatus is provided for forming the overload signal $O_r$, having a high level whenever clutch 203 begins to slip appreciably (as when ram 107 is obstructed or otherwise jammed). This apparatus may take many forms, and is exemplified in FIG. 6 by a switch 204 which is affixed to one plate of clutch 203 and has its actuating pin riding on a toothed gear 105 affixed to the other plate of clutch 203. Thus when there is relative slippage between the two plates, switch 204 will be repeatedly opened and closed, thus causing a series of electrical impulses which, when rectified by a diode 209, form the overload signal $O_r$ at its high level.

Each of the other motor units is similarly responsive to their applied actuating signals, and similarly operable for forming their corresponding overload signals. Amplifier 200*a* and relay 201*a* may of course be eliminated in those unidirectionally rotating units (units 80*a*, 81*a* and 96*a*) which receive only one output signal.

Output signal T, as shown in FIG. 6 is applied via an amplifier 210 to solenoid 83 and at its high level causes turning pin 103 to be erected. Output signal $A_l$ is directly applied to energize an alarm klaxon. The utilization of signals $u_1, u_2 \ldots u_{10}$ and Synch is not shown, since these signals may be applied to any convenient form of display or recording apparatus. It should be noted that the signals $u_1, u_2 \ldots u_{10}$ although serially formed are held in corresponding output capacitors, so that they are available in parallel when signal Synch is issued.

Referring now to the input signals, it is seen that all of the overload signals $O_l$, $O_i$, $O_r$, $O_s$, $O_e$ and $O_w$ are applied to the computer via input cable 11. Signals $R_b$ and $R_o$ are generated at their high levels by limit switches 220 and 221 respectively, upon being actuated (closed) by ram 107 at its extreme "out" and "back" positions. Signal $P_1$ at its high level is produced by photocell 104 via an inverting amplifier 221 whenever the photocell is illuminated. Signal $W_3$ is formed at its high level (through an amplifier 222) whenever photocell 121 is illuminated.

The signals Stop, Start and Stop are formed at their high levels upon closure of switches 27, 28 and 29, respectively (which are provided on control panel 20).

Signals $S_o$ and $S_b$ are formed at their high levels upon actuation of limit switches 225 and 226, respectively by stripper plate 108 at its extreme "out" and "back" positions. Signal $P_2$, as shown is formed at its high level upon illumination of photocell 114 through any clearance beneath the stripper plate.

Signal $W_2$ is formed at its high level upon actuation of limit switch 120. Signal $E_d$ is formed at its high level, upon actuation of a limit switch 228 by elevator slides 111 at their extreme down position.

Signal $W_1$ is formed at its high level when a pallet being drawn into the elevator well strikes against and is centered by a pair of pivoted spring loaded arresting bars 230 symmetrically positioned on both sides of the elevator. These bars are forced to slide forward slightly, thus actuating through a parallelogram coupling corresponding limit switches 232 which generate signal $W_2$. When the pallet is raised, switches 232 are released returning signal $W_2$ to its low level. For purposes of clarity, the second switch 232 is not shown in its true physical position. The structure of arresting bars 230 is essentially that described in the aforesaid patent to Bruce. As shown there, the arresting bars are automatically pivoted downwards out of the way upon descent of a loaded pallet, so that they do not prevent withdrawal of a loaded pallet, but merely act to arrest and center an unloaded pallet as it enters the elevator well.

In addition to the input and output signals which have been defined and described hereinabove, there are also a large number of auxiliary signals which are generated and used within the computer. As hereinbefore mentioned, almost all of these auxiliary signals are associated with various (binary) counts which are maintained within the computer.

The following counts are maintained:

The *l* count—a count of the number of boxes that have entered any given line.

The *d* count—a delay count made to establish a predetermined time interval after completion of a line count.

The *s* count—a count of the number of lines that have been rammed in any given layer.

The *e* count— a count of the number of layers that have been formed in any given stack.

The *u* sum—a total, as hereinbefore indicated, of the dollar value (calculated at $300 per pallet) of the number of completed pallets withdrawn from the pallet loader.

The names and significance of each of the auxiliary signals, including those associated with the above counts (and sum) are listed hereinbelow:

| Signal | Significance |
|---|---|
| $l_1, l_2, l_3$ | Successive binary digits of the $l$ count. |
| $l_o$ | Indicates that a line count corresponding to a full line has been completed. (Here either a count of 3 or 6 boxes in a line, as determined by the stacking pattern.) |
| $l_z$ | Indicates that the line count is zero ($l_1=0$, $l_2=0$, $l_3=0$). |
| $l_i$ | Indicates that the line count is to be increased by one. May be considered as input signal to the $l$ count. |
| $l_c$ | A carry signal produced upon any overflow of the line count (from 111 to 000). |
| $d_1, d_2 \ldots d_6$ | Successive binary digits of the $d$ count. |
| $d_o$ | Indicates that a predetermined delay count (selected as the count of 60) has been completed. |
| $d_z$ | Indicates that the delay count is zero. |
| $d_i$ | Indicates that the delay count is to be increased by one. |
| $s_1, s_2, s_3$ | Successive binary digits of the $s$ count. |
| $s_o$ | Indicates that the $s$ count corresponding to a full layer has been completed. (In the present example a count of four, since there are four lines in a layer.) |
| $s_z$ | Indicates that the $s$ count is zero. |
| $s_i$ | Indicates that the $s$ count is to be increased by one. |
| $s_c$ | A carry signal produced upon any overflow of the $s$ count (from 111 to 000). |
| $e_1, e_2, e_3$ | Successive binary digits of the $e$ count. |
| $e_o$ | Indicates that the $e$ count corresponding to a full stack has been completed. (Here a count of six, since there are six layers in a stack.) |
| $e_z$ | Indicates that the $e$ count is zero. |
| $e_i$ | Indicates that the $e$ count is increased by one. |
| $u_1, u_2, \ldots u_{10}$ | Successive binary digits of the $u$ sum. |
| $u_i$ | Indicates that a completed pallet has been withdrawn and that the $u$ sum should be increased by 3 ($300). |
| $P_0$ | Indicates the old value of photocell signal $P_1$, as received in the previous cycle of operation of the computer. From a comparison of $P_0$ and $P_1$ it is determined whether a new box has blanked input photocell 104. |
| $t_0$ | Indicates that a box is to be turned. |
| $r$ | Indicates that operation of the pallet loader is to continue—that the pallet loader is to run. |

A few statements should be made about the manner in which the $l$, $d$, $e$, and $s$ counts are utilized in the control of pallet loader 5 in accordance with the desired operation of pallet loader 5.

In forming a line, as each entering box goes past photocell 104, an $l$ count $l_i$ is added to the line count $l$. The line is complete when the count $l_o$ is attained and the input motor is then stopped so that more boxes cannot enter. Inputs $d_i$ to the delay count $d$ begin upon appearance of $l_o=1$ and add 1 to this count each revolution of the drum. The delay count is provided to give enough time for the line to be compacted, before the ram is started. After 60 delay counts further delay counts are stopped, and the ram is moved out. When the ram trips its extreme "out" limit switch, additional counts are made into the $d$ count to clear it to zero. As soon as the $d$ count is zeroed, additional counts are made into the line count $l$ to clear it to zero ($l_z$) so that it is thus prepared to count the boxes of the next line. After the line count is cleared ($l_z$) the ram is returned (back) and the input motor started again to admit the boxes for the next line.

The carries $l_c$, produced by each clearing of the line count $l$, are used as inputs $s_i$ to the $s$ count, so that the $s$ count maintains a record of how many lines have been rammed in a layer. When the $s$ count shows ($s_o$) that four lines have been received, indicating that a layer has been completed, the stripper plate is withdrawn (out) the layer dropped, the elevator moved down until photocell 114 is unbalanced and the stripper plate returned (back) so that another layer can be formed. While the elevator is descending to its new position beneath the stripper plate, additional inputs ($s_i$) are made to the $s$ count to clear it to zero ($s_z$) so that it will be prepared to count the lines of the next layer.

The carries $s_c$ produced by each clearing of the $s$ count are used as inputs ($e_i$) to the $e$ count, so that the $e$ count maintains a record of how many layers have been deposited on a stack. When the predetermined $e$ count ($e_o$) shows that 6 layers have been deposited, this is an indication that the stack has been completed, and therefore the elevator does not descend to an intermediate position but instead descends all the way to the bottom of the elevator well to its extreme "down" position. The $e_o$ count is not changed then, until the old loaded pallet is withdrawn and a new empty pallet has been drawn into and centered in the elevator well ($W_1$). At this time additional inputs $e_i$ are made to the $e$ count to clear it to zero ($e_z$), so that it will thus be prepared for the counting of layers of the next stack.

In continuing operation, the elevator then ascends bearing the new empty pallet, until it blanks the photocell 114 immediately beneath the stripper plate. Preparation of another stack will then be accomplished in the same way.

From consideration of the above-provided descriptions of the desired operation of pallet loader 5, Boolean equations defining the various output signals and auxiliary signals may now be written and described.

It is convenient to begin with the equations for the auxiliary signals:

(1) $P_0=P_1$

The $P_0$ signal stores the previous value of the input photocell signal $P_1$, so that a change in the photocell output can be detected.

(2) $l_i=P_0P'_1+R_0l'_zd_z$

An input $l_i$ to the $l$ count is formed whenever the quantity $P_0P'_1$ shows that input photocell 104 has changed from an illuminated to non-illuminated condition in two successive turns of the drum, indirectly that a box has passed before the photocell. Inputs are also formed at the ram out position ($R_o$) after the delay count has been zeroed ($d_z$) and continues until the line count is cleared ($l_z$).

(3) $l_z=l'_3l'_2l'_1$

Signal $l_z$ corresponds to the binary count of 0 in the successive digits of the $l$ count.

(4) $l_o=l_3l_2l'_1(e'_1s'_1+e_1s_1)+l'_3l_2l_1(e'_1s_1+e_1s'_1)$

From a consideration of the stacking pattern shown in FIG. 5, it is clear that the number of boxes in a line ($l_o$) is to be six ($l_3l_2l'_1$) when the layer and line are both odd or both even ($e'_1s'_1+e_1s_1$) or will be three ($l'_3l_2l_1$) when the layer and line are different.

(5) $t_0=e'_1s'_1+e_1s_1$

As shown in the stacking pattern, boxes are to be turned sidewise ($t_0$) only when layer and line are both odd or both even.

(6) $d_i=l_o(d'_o+R_o)$

Inputs $d_i$ to the $d$ count are started when a line count is completed ($l_o$) and continue until the relay count is completed ($d_o$). In addition when the ram is out ($R_o$), the counter is cleared by counting until an overflow $d_c$ occurs, which advances (see Eq. 2) the $l$ count away from $l_o$ ($l'_o$) and thus prevents further inputs to the $d$ count, therefore leaving it zeroed.

(7) $d_o=d_6d_5d_4d_3d'_2d'_1$

Signal $d_o$ corresponds to the binary count of 60 in the successive digits of the $d$ count.

(8) $d_z=d'_6d'_5d'_4d'_3d'_2d'_1$

Signal $d_z$ corresponds to the binary count of zero in the $d$ count.

(9) $s_i=l_c+S_os'_z$

Clearing of the line count causes a carry ($l_c$) into the $s$ count. The $s$ count is zeroed when the stripper plate is out ($S_o$) corresponding to the time at which the elevator is lowered.

(10) $s_o=s_3s'_2s'_1$

Signal $s_o$ corresponds to the binary count of 4 in the $s$ count.

(11) $s_z=s'_3s'_2s'_1$

Signal $s_z$ corresponds to the binary count of zero.

(12) $e_i=s_c+EdW_1e'_z$

Clearing of the $s$ count causes a carry $s_c$ into the $e$ count. The $e$ count is counted to zero when the elevator is down and the new pallet centered.

(13) $e_o = e_3 e_2 e'_1$

Signal $e_o$ corresponds to the binary count of 6 in the $e$ count.

(14) $e_z = e'_3 e'_2 e'_1$

Signal $e_z$ represents the binary count of zero in the $e$ count.

The carry signals $l_c$, $d_c$, and $s_c$ are not separately defined, since they are merely simple binary carries arising from the highest order digits of their respective counts.

(15) $u_1 = M_w W_1 e'_o$

An input $u_1$ is made to the $u$ sum whenever a pallet withdrawal is completed, as indicated by the centering signal $W_1$ becoming 1, while the withdrawal motor is being directed to run ($M_w$). Only one input $u_1$ is produced in this event since $M_w$ will be changed to 0, during the same turn of the drum. Three ($300) is added to the $u$ sum for each input $u_1 = 1$.

(16) $r = r(O'_l O'_1 O'_r O'_s O'_e O'_w) Stop'(R'_b + M_l + P_1)(E'_d + P_2)(M'_w + W'_1 + Stop') + Start$ Any of the overload signals at its $l$ value will immediately stop the machine. The $r$ signal controls itself in order to keep the machine stopped until restarted by hand (Start). The function $(R'_b + M_l + P_1)$ checks the input photocell 104 and $E'_d + P_2$ checks the elevator photocell 114, preventing operation if their light sources have failed. If the normal Stop signal is applied, the machine will stop at completion of the next pallet withdrawal. $(M'_w + W'_1 + Stop')$.

The various output signals may now be considered:

(17) $M_l = r R_b l'_o (Stop' + e'_o)$

This is a self latching equation. If the run signal is on ($r$) and a line is not complete ($l'_o$), the input motor runs, provided the ram is back until the line is completed and then stops. The line count is zeroed at the ram-out position ($l'_o$ again equals 1) so that the input motor will start again when the ram returns back. If a normal Stop signal is applied, the input will stop when a stack is completed $(Stop' + e'_o)$.

(18) $M_l = r$

The line motor runs continuously as long as the pallet loader is running.

(19) $T = t_0 r$

The turning pin is selectively extended as determined by signal $t_0$ in accordance with the dictates of the stacking pattern (see Eq. 5, supra).

(20) $M_{ro} = r d_o S_b$

The ram out motor control is actuated when the delay count of 60 ($d_o$) is attained, provided the stripper plate is back ($S_b$). During the time a completed layer is being lowered, the next line is prepared and will be rammed as soon as the plate returns. The $d$ count is cleared at the ram-out position and this serves to turn $M_{ro}$ off.

(21) $M_{rb} = r l_z R'_b$

The clearing of the $l$ count starts the ram motor back. It is stopped by the ram-back limit switch proposition $R_b$.

(22) $M_{20} = r s_o S'_o M'_{ed} M'_{eu} E'_d$

The stripper plate is pulled out when the $s$ count is completed ($s_o$) and the ram is out. (The counting operation into the $s$-counter takes place when the $l$ counter is cleared and since this occurs at $R_o$, the $s$ proposition can only go to 1 when the ram is out.) The limit switch signal $S_o$ stops $M_{so}$. The terms $M'_{ed} M'_{eu} E'_d$ prevent the stripper plate from being pulled out while the elevator is occupied with the discharge of a completed pallet. The next layer can, however, be prepared.

(23) $M_{sb} = r s'_o S'_b P_2$

The $s$-counter is cleared (forming $s'_o$) by $S_o P_2$, i.e., when the stripper plate is out and the elevator lowered and thus it is at that time that the signal $M_{sb}$ will be turned on to return the stripper plate to its back position. Note that $P_2$ will be 1 until the next layer is dropped, which occurs prior to $S_o$, hence the $S_o$ term must be included.

(24) $M_{ed} = r(s_o S_o + e_o E'_d + M_{ed} P'_2)$

The elevator starts down when the stripper plate reaches its full out position ($s_o S_o$ and continues down until the photocell is unblanked ($M_{ed} P'_2$). If $e_o$ becomes 1, the elevator continues down until stopped by the limit switch signal $E_d$.

(25) $M_w = r E_d W'_1 W'_2 W'_3$

Since the withdrawing mechanism operates an endless chain, the chain simply moves forward one interval when the elevator bottoms ($E_d$) and stops when the new pallet is centered ($W_1$). Signals $W'_2$ and $W'_3$ prevent operation if the pallet dock is full or the pallet hopper is empty.

(26) $M_{eu} = (M_w e'_o W_1 + M_{eu} + Start) P_2 r$

The elevator motor starts up at the same time that the withdrawal motor stops ($M_w e'_o W_1$). It is turned off by intercepting the photocell beam ($M_{eu} P_2$). When the pallet loader is started by the Start, it may be applied continuously to drive the elevator up until the photocell is blanked (Start $P_2$).

(27) $A_1 = r' \underline{Stop'}$

The alarm is sounded if $r$ goes to zero for any reason other than the Stop signal.

For purposes of convenient reference, the above-developed equations for the various output signals and auxiliary signals are collected below, in Table 3.

TABLE 3

$$P_0 = P_1 \quad (1)$$

$$l_1 = P_0 P'_1 + R_o l'_z d_z \quad (2)$$

$$l_z = l'_3 l'_2 l'_1 \quad (3)$$

$$l_o = l_3 l_2 l'_1 (e'_1 s'_1 + e_1 s_1) + l'_3 l_2 l_1 (e'_1 s_1 + e_1 s'_1) \quad (4)$$

$$t_o = e'_1 s'_1 + e_1 s_1 \quad (5)$$

$$d_1 = l_o (d'_o + R_o) \quad (6)$$

$$d_o = d_6 d_5 d_4 d_3 d'_2 d'_1 \quad (7)$$

$$d_z = d'_6 d'_5 d'_4 d'_3 d'_2 d'_1 \quad (8)$$

$$s_1 = l_c + S_o s'_z \quad (9)$$

$$s_o = s_3 s'_2 s'_1 \quad (10)$$

$$s_z = s'_3 s'_2 s'_1 \quad (11)$$

$$e_1 = s_c + E_d W_1 e'_z \quad (12)$$

$$e_o = e_3 e_2 e'_1 \quad (13)$$

$$e_z = e'_3 e'_2 e'_1 \quad (14)$$

$$u_1 = M_w W_1 e'_o \quad (15)$$

$$r = r(O'_l O'_1 O'_r O'_s O'_e O'_w) \underline{Stop'}(R'_b + M_l + P_1)(E'_d + P_2)(M'_w + W'_1 + Stop' + Start \quad (16)$$

$$M_l = r R_b l'_o (Stop' + e'_o) \quad (17)$$

$$M_l = r \quad (18)$$

$$T = t_0 r \quad (19)$$

$$M_{ro} = r d_o S_b \quad (20)$$

$$M_{rb} = r l_z R'_b \quad (21)$$

$$M_{so} = r s_o S'_o M'_{ed} M'_{eu} E'_d \quad (22)$$

$$M_{sb} = r s'_o S'_b P_2 \quad (23)$$

$$M_{ed} = r(s_o S_o + e_o E'_d + M_{ed} P'_2 \quad (24)$$

$$M_w = r E_d W'_1 W'_2 W'_3 \quad (25)$$

$$M_{eu} = (M_w e'_o W_1 + M_{eu} + Start) P_2 r \quad (26)$$

$$A_1 = r' \underline{Stop'} \quad (27)$$

The manner in which the signals defined by Eqs. 1–27, are formed by the computer of the invention is shown in detail in the following table, Table 4, wherein are

TABLE 4

| Cell No. | Signal | Instruction sequences presented during successive turns of the information channel | | | | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| 1 | O |5 |5 |5 |5 | |5 |5 |7 | | |5 |5 |5 | | | | | | | | | |5 | |5 | |5 | |5 |5 |5 |5 |5 |5 | |5 |5 |5 |5 |5 |5 |5 |5 |5 |5 |5 | |
| 2 | $O_i$ |4 | | | | | | |2 | | | | | | | | | | | | | | | | | | | | | | | | | | | | | | | | | | | | | | | |
| 3 | $O_l$ | |4 | | | | | |2 | | | | | | | | | | | | | | | | | | | | | | | | | | | | | | | | | | | | | | | |
| 4 | $O_r$ | | |4 | | | | |2 | | | | | | | | | | | | | | | | | | | | | | | | | | | | | | | | | | | | | | | |
| 5 | $O_s$ | | | |4 | | | |2 | | | | | | | | | | | | | | | | | | | | | | | | | | | | | | | | | | | | | | | |
| 6 | | | | | | | | | | | | | | | | | | | | | | | | | | | | | | | | | | | | | | | | | | | | | | | | |
| 7 | $O_e$ | | | | | |4 | |2 | | | | | | | | | | | | | | | | | | | | | | | | | | | | | | | | | | | | | | | |
| 8 | $O_w$ |7 | |7 | | | |4 |2 | |7 | | | | | | | | | | | | | | | | | | | | | | | | | | | | | | | | | | | | | |
| 9 | $R_b$ |2 | |1 | | | | | | |2 |4 | | | | | | | | | | | | | | | | | | | | | | | | | | | | | | | | | | | | |
| 10 | $M_i$ |6 |7 | |7 | | | | | | | | | | | |4 | | | | | | | | | | | | | | | | | | | | | | | | | | | | | | | |
| 11 | $P_1$ |6 |2 | |1 | | | | | | | |4 | | | | | | | | | | | | | | | | | | | | | | | | | | | | | | | | | | | |
| 12 | $P_0$ | |1 | |4 | | | | | | | | | | | | | | | | | | | | | | | | | | | | | | | | | | | | | | | | | | | |
| 13 | $P_0P'_1$ | |4 | | | | | | | | | | | |6 | | | | | | | | | | | | | | | | | | | | | | | | | | | | | | | | | |
| 14 | Stop |2 | | | | | | | | | | | | | | | | | | | | | |4 | | | | | | | | | | | | | | | | | | | | | | | | |
| 15 | Stop'($R_b+M_i+P_1$) |4 | | | | | | |1 | | | | | | | | | | | | | | | | | | | | | | | | | | | | | | | | | | | | | | | |
| 16 | | 7 | | | | | | | | | |7 | | | | | | | | | | | | | | | | | | | | | | | | | | | | | | | | | | | | |
| 17 | $E_d$ |2 | | | | | | | | | |2 |7 | | |1 | | | |2 | | | | |1 |4 | | | | | | | | | | | | | | | | | | | | | | |
| 18 | $P_2$ |6 | | | | | | | | | | |1 | | | | | |2 | | | |1 | | | | | | | | |4 | | | | | | | | | | | | | | | | |
| 19 | | | | | | | | | | | | | | | | | | | | | | | | | | | | | | | |7 | | | | | | | | | | | | | | | | |
| 20 | $E'_d+P_2$ |4 | | | | | | |1 | | | | | | | | | | | | | | |4 | | | | | | | |2 | | | | | | | | | | | | | | | | |
| 21 | $M_{ed}P'_2$ |7 | | | | | | | | | | | | | | | | |4 |6 | | | |7 | | | | | | | | | | | | | | | | | | | | | | | | |
| 22 | $W_1$ | | | | | | | | | | | | | | | | | | | |4 | | |2 | | | | | | | | | | | | | | | | | | | | | | | | |
| 23 | $M_w$ | | | |7 | | | | | | | | | | | | | | | |1 | | | | | | | | | | | | | | | | | | | | | | | | | | | |
| 24 | $M_wW_1e'_o$ |1 | | | | | | | | | | | | | | | | | | | | | | | | | | | | | | | | | |4 | | | | | | | | | | | | |
| 25 | Stop |1 | | |1 | | | | | | | | | | | | | | | | | | | | | | | | | |4 | | | | | | | | | | | | | | | | | |
| 26 | Stop ($M_wW_1e'_o$) |4 | | | | | |7 |2 | | | | | | | | | | | | | | | | | | | | | | | | | | | | | | | | | | | | | | | |
| 27 | $r$ | | |1 | | | |1 |1 |4 |1 | |1 | | | | | | | | | | | | | | | | | | | | | | | | | | | | | | | | | | | |
| 28 | Start | | | | | | | |6 | | | | | | | | | | | | |6 | | | | | | | |4 | | | | | | | | | | | | | | | | | | |
| 29 | $r$ | | | | | | | |4 | | |1 | | | | | | | | | | |1 | |1 | | | | | | |2 | | | | | | | | | | | | | | | | |
| 30 | $R_o$ | | | | | | | | | | | | |4 | | | | | | | | | | | | | | |6 | | | | | | | | | | | | | | | | | | | |
| 31 | $S_b$ | | | | | | |1 | | | | |2 | | | |7 | |7 | | | | | | | | |4 | | | | | | | | | | | | | | | | | | | | |
| 32 | $S_o$ | | | | | | | | | | |2 | | | | |1 | |1 | | | | | | | | | | | | | |4 | | | | | | | | | | | | | | | |
| 33 | | | | | | | | | | | | | | | | | | | | | | | | | | | | | | | | | | | | | | | | | | | | | | | | |
| 34 | $W_2$ | | | | | | | | | | | | | | | | | | | | | | | |2 | | | | | | | | |4 | | | | | | | | | | | | | | |
| 35 | $W_3$ | | | | | | | | | | | | | | | | | | | | | | | |2 | | | | |7 | | | | |4 | | | | | | | | | | | | | |
| 36 | $l_i$ | | | | | | | | | | | | | |4 | | | | | | | | | | | | | | |1 | | | | | | | | | | | | | | | | | | |
| 37 | | 7 |7 | | |7 | | | | | | | | | | | | | | | | | | | | | | | | | | | | | | | | | | | | | | | | | | |
| 38 | $l_1$ |2 |2 | | |1 | | | | | | | | | | | | | | | | | | | | | | | |3 | | | | | | | | | | | | | | | | | | |
| 39 | $l_2$ |2 |1 | | |1 | | | | | | | | | | | | | | | | | | | | | | | |3 | | | | | | | | | | | | | | | | | | |
| 40 | $l_3$ |2 |1 | | |2 | | | | | | | | | | | | | | | | | | | | | | | |3 | | | | | | | | | | | | | | | | | | |
| 41 | $l_c$ | | | | | | | | | | | | | | | | |6 | | | | | | | | | | | |4 | | | | | | | | | | | | | | | | | | |
| 42 | $l_z$ |4 | | | | | | |7 |1 | | |2 | | | | | | | | | | | | | | | | | | | | | | | | | | | | | | | | | | | |
| 43 | $l'_1l_2l_3$ | |4 | | | | | | |1 | | | | | | | | | | | | | | | |7 | | | | | | | | | | | | | | | | | | | | | | |
| 44 | $l_1l_2l'_3$ | | | | |4 | | | | | | | | | | | | | | | | | | | |1 | | | | | | | | | | | | | | | | | | | | | | |
| 45 | | | | | | | | | | | | | | | | | | | | | | | | | | | | | | | | | | | | | | | | | | | | | | | | |
| 46 | | | | | | | | | | | | | | | | | | | | | | | | | | | | | | | | | | | | | | | | | | | | | | | | |
| 47 | $l_o$ | | |2 | | | | | | | | | | | | | | | | | | | | | | |4 | |1 |7 | | | | | | | | | | | | | | | | | | |
| 48 | $d_i$ | | | | | | | | | | | | | | | | | | | | | | | | | | | |4 |1 | | | | | | | | | | | | | | | | | | |
| 49 | | 7 |7 | | | | | | | | | | | | | | | | | | | | | | | | | | | | | | | | | | | | | | | | | | | | | |
| 50 | $d_1$ |2 |2 | | | | | | | | | | | | | | | | | | | | | | | | | | |3 | | | | | | | | | | | | | | | | | | |
| 51 | $d_2$ |2 |2 | | | | | | | | | | | | | | | | | | | | | | | | | | |3 | | | | | | | | | | | | | | | | | | |
| 52 | $d_3$ |2 |1 | | | | | | | | | | | | | | | | | | | | | | | | | | |3 | | | | | | | | | | | | | | | | | | |
| 53 | $d_4$ |2 |1 | | | | | | | | | | | | | | | | | | | | | | | | | | |3 | | | | | | | | | | | | | | | | | | |
| 54 | $d_5$ |2 |1 | | | | | | | | | | | | | | | | | | | | | | | | | | |3 | | | | | | | | | | | | | | | | | | |
| 55 | $d_c$ |2 |1 | | | | | | | | | |1 | | | | | | | | | | | | | | | | |3 | | | | | | | | | | | | | | | | | | |
| 56 | $d_z$ |4 | | | | | | | | | | | | | | | | | | | | | | | | | |7 | | | | | | | | | | | | | | | | | | | | |
| 57 | $d_o$ | |4 | | |7 | |1 | | | | | | | | | | | | | | | | | | | |2 | | | | | | | | | | | | | | | | | | | | |
| 58 | $rR_bl'_o$ | | |4 | |1 | | | | | | | | | | | | | | | | | | | | | | | | | | | | | | | | | | | | | | | | | | |
| 59 | | | | | | | | | | | | | | | | | | | | | | | | | | | | | | | | | | | | | | | | | | | | | | | | |
| 60 | | | | | | | | | | | | | | | | | | | | | | | | | | | | | |7 | | | | | | | | | | | | | | | | | | |
| 61 | $s_i$ |7 |7 |7 | | | | | | | | | | | | | |4 | | | | | | | | | | | |1 | | | | | | | | | | | | | | | | | | |
| 62 | $s_1$ |2 |1 |2 | | | | | | | | | | | | | | | | | | | | | | | | | |3 | | | | | | | | | | | | | | | | | | |
| 63 | $s_2$ |2 | |2 | | | | | | | | | | | | | | | | | | | | | | | | | |3 | | | | | | | | | | | | | | | | | | |
| 64 | $s_3$ |2 | |1 | | | | | | | | | | | | | | | | | | | | | | | | | |3 | | | | | | | | | | | | | | | | | | |
| 65 | $s_c$ | | | | | | | | | | | | | | |6 | | | | | | | | | | | | | |4 | | | | | | | | | | | | | | | | | | |
| 66 | $s_z$ |4 | | | | | | | | | | | | | | |2 | | | | | | | | | | | | | | | | | | | | | | | | | | | | | | | |
| 67 | $s_o$ | | |4 | | | | | | | |1 |2 | | | | | |1 | | | | | | | | | | | | | | | | | | | | | | | | | | | | | |
| 68 | $s_oS_o$ | | | | | | | | | | | | | | | | | |4 |6 | | | | | | | | | | | | | | | | | | | | | | | | | | | | |
| 69 | | | | | | | | | | | | | | | | | | | | | | | | | | | | | |7 | | | | | | | | | | | | | | | | | | |
| 70 | $e_i$ |7 | |7 | | | | | | | | | | | |4 | | | | | | | | | | | | | |1 |7 | | | | | | | | | | | | | | | | | |
| 71 | $e_1$ |2 | |2 | | |7 | | | | | | | | | | | | | | | | | | | | | | |3 |1 | | | | | | | | | | | | | | | | | |
| 72 | $e_1$ | |3 | | | |2 | | |2 | | | | | | | | | | | | | | | |1 | | | | |4 | | | | | | | | | | | | | | | | | |
| 73 | $e_2$ |2 | |1 | | | | | | | | | | | | | | | | | | | | | | | | | |3 | | | | | | | | | | | | | | | | | | |
| 74 | $e_3$ |2 | |1 | | | | | | | | | | |7 | | | | | | | | | | | | | | |3 | | | | | | | | | | | | | | | | | | |
| 75 | $e_z$ |4 | | | | | | | | | | | | |2 | | | |7 | | | | | | | | | | | | | | | | | | | | | | | | | | | | | |
| 76 | $e_o$ | | |4 |1 | | | | | | | | | | | | | |1 | |2 | | | | | | | | | | | | | | | | | | | | | | | | | | | |
| 77 | Stop $e_o$ | | | |4 |2 | | | | | | | | | |7 | | | | | | | | | | | | | | | | | | | | | | | | | | | | | | | | |
| 78 | $M_i$ | | | | |4 | | | | | | | | | |1 | | | | | | | | | | | | | | | | | | | | | | | | | | | | | | | | |
| 79 | $r$ | | | | | |1 | |4 | | | | | | | | | | | | | | | | | | | | | | | | | | | | | | | | | | | | | | | |
| 80 | | 7 | | | | | | | | | | | | | | | | | | | | | | | | | | | | | | | | | | | | | | | | | | | | | | |
| 81 | $u_i$ |1 | | | | | | | | | | | | | | | | | | |4 |6 | | | | | | | | | | | | | | |7 |7 |7 |7 |7 |7 |7 |7 |7 |7 |7 |7 | |
| 82 | $u_1$ |3 |7 | | | | | | | | | | | | | | | | | | | | | | | | | | | | | | | |7 |1 | | | | | | | | | | | | |
| 83 | $u_i$ |3 |1 | | | | | | | | | | | | | | | | | |4 | | | | | | | | | | | | | |1 | | | | | | | | | | | | | |
| 84 | $u_2$ | |3 |7 | | | | | | | | | | | | | | | | | | | | | | | | | | | | | | | | |1 | | | | | | | | | | | |
| 85 | $u_ic_1$ |4 |3 |1 | | | | | | | | | | | | | | | | | | | | | | | | | | | | | | | | | | | | | | | | | | | | |
| 86 | $u_3$ | | |3 | | | | | | | | | | | | | | | | | | | | | | | | | | | | | | | | | |1 | | | | | | | | | | |
| 87 | $u_4$ | | |3 | | | | | | | | | | | | | | | | | | | | | | | | | | | | | | | | | | |1 | | | | | | | | | |
| 88 | $u_5$ | | |3 | | | | | | | | | | | | | | | | | | | | | | | | | | | | | | | | | | | |1 | | | | | | | | |
| 89 | $u_6$ | | |3 | | | | | | | | | | | | | | | | | | | | | | | | | | | | | | | | | | | | |1 | | | | | | | |
| 90 | $u_7$ | | |3 | | | | | | | | | | | | | | | | | | | | | | | | | | | | | | | | | | | | | |1 | | | | | | |
| 91 | $u_8$ | | |3 | | | | | | | | | | | | | | | | | | | | | | | | | | | | | | | | | | | | | | |1 | | | | | |
| 92 | $u_9$ | | |3 | | | | | | | | | | | | | | | | | | | | | | | | | | | | | | | | | | | | | | | |1 | | | | |
| 93 | $u_{10}$ | | |3 | | | | | | | | | | | | | | | | | | | | | | | | | | | | | | | | | | | | | | | | |1 | | | |
| 94 | $r$ | | | | | | | |4 | | | | | | | | |7 | |1 | | | | | | | | | | | | | | | | | | | | | | | | | | | | |
| 95 | $M_{ed}$ | | | | | | | | | | |2 | | | | | |1 | |4 | | | | | | | | | | | | | | | | | | | | | | | | | | | | |
| 96 | $l'_1l_2l_3(e'_1-s_1)$ | | | | | | | | |4 | | | | | | | | | | |7 | | | | |6 |7 | | | | | | | | | | | | | | | | | | | | | |
| 97 | $M_{eu}$ | | | | | | | | | |2 | | | | | | | | | |1 | |4 | | | |1 | | | | | | | | | | | | | | | | | | | | | |
| 98 | | 7 | | | | | | | | | | | | | | | | | | | | | | | | | | | | | | | | | | | | | | | | | | | | | | |
| 99 | $r=M_1$ |1 | | | | | |5 |4 | | | | | | | | | | |5 | | | | | | | | | | | | | | | | | | | | | | | | | | | | |
| 100 | | | | | | | | | | | | | | | | | | | | | | | | | | | | | | | | | | | | | | | | | | | | | | | | |

TABLE 5

*Instruction Sequence and Resulting Signals for 1st Turn of Information Channel*

| Cell No. | Signal | Instruction | Signal in K | Signal |
|---|---|---|---|---|
| 1 | O | 5 | | |
| 2 | $O_i$ | 4 | $O_i$ | $O_i$ |
| 3 | $O_l$ | | | |
| 4 | $O_r$ | | | |
| 5 | $O_e$ | | | |
| 6 | | | | |
| 7 | $O_e$ | | | |
| 8 | $O_w$ | 7 | | |
| 9 | $R_b$ | 2 | 1 | |
| 10 | $M_i$ | 6 | $R'_b$ | |
| 11 | $P_1$ | 6 | $R'_b+M_i$ | |
| 12 | $P_0$ | | $R'_b+M_i+P_1$ | |
| 13 | $P_0P'_1$ | | | |
| 14 | <u>Stop</u> | 2 | | |
| 15 | <u>Stop'</u> $(R'_b+M_i+P_1)$ | 4 | <u>Stop'</u> $(R'_b+M_i+P_1$ | <u>Stop'</u> $(R'_b+M_i+P_1)$ |
| 16 | | 7 | | |
| 17 | $E_d$ | 2 | 1 | |
| 18 | $P_2$ | 6 | $E'_d$ | |
| 19 | | | $E'_d+P_3$ | |
| 20 | $E'_d+P_2$ | 4 | | $E'_d+P_2$ |
| 21 | $M_{ed}P'_2$ | 7 | | |
| 22 | $W_1$ | | 1 | |
| 23 | $M_w$ | | | |
| 24 | $M_wW_1e'_o$ | 1 | | |
| 25 | Stop | 1 | $M_wW_1e'_o$ | |
| 26 | Stop $(M_wW_1e'_o)$ | 4 | Stop $M_wW_1e'_o$ | Stop $M_wW_1e'_o$ |
| 27 | $r$ | | | |
| 28 | Start | | | |
| 29 | $r$ | | | |
| 30 | $R_o$ | | | |
| 31 | $S_b$ | | | |
| 32 | $S_o$ | | | |
| 33 | | | | |
| 34 | $W_2$ | | | |
| 35 | $W_3$ | | | |
| 36 | $l_i$ | | | |
| 37 | | 7 | | |
| 38 | $l_1$ | 2 | 1 | |
| 39 | $l_2$ | 2 | $l'_1$ | |
| 40 | $l_3$ | 2 | $l'_1l'_2$ | |
| 41 | $l_c$ | | $l'_1l'_2l'_3$ | |
| 42 | $l_z$ | 4 | | $l_z$ |
| 43 | $l'_1l_2l_3$ | | | |
| 44 | $l_1l_2l'_3$ | | | |
| 45 | | | | |
| 46 | | | | |
| 47 | $l_o$ | | | |
| 48 | $d_i$ | | | |
| 49 | | 7 | | |
| 50 | $d_1$ | 2 | 1 | |
| 51 | $d_2$ | 2 | $d'_1$ | |
| 52 | $d_3$ | 2 | $d'_1d'_2$ | |
| 53 | $d_4$ | 2 | $d'_1d'_2d'_3$ | |
| 54 | $d_5$ | 2 | $d'_1d'_2d'_3d'_4$ | |
| 55 | $d_6$ | 2 | $d'_1d'_2d'_3d'_4d'_5$ | |
| 56 | $d_z$ | 4 | $d'_1d'_2d'_3d'_4d'_5d'_6$ | $d_z$ |
| 57 | $d_o$ | | | |
| 58 | $rR_bl'_o$ | | | |
| 59 | | | | |
| 60 | | | | |
| 61 | $s_i$ | 7 | | |
| 62 | $s_1$ | 2 | 1 | |
| 63 | $s_2$ | 2 | $s'_1$ | |
| 64 | $s_3$ | 2 | $s'_1s'_2$ | |
| 65 | $s_c$ | | $s'_1s'_2s'_3$ | |
| 66 | $s_z$ | 4 | | $s_z$ |
| 67 | $s_o$ | | | |
| 68 | $s_oS_o$ | | | |
| 69 | | | | |
| 70 | $e_i$ | 7 | | |
| 71 | $e_1$ | 2 | 1 | |
| 72 | $e_1$ | | $e'_1$ | |
| 73 | $e_2$ | 2 | | |
| 74 | $e_3$ | 2 | $e'_1e'_2$ | |
| 75 | $e_z$ | 4 | $e'_1e'_2e'_3$ | $e_z$ |
| 76 | $e_o$ | | | |
| 77 | Stop $e_o$ | | | |
| 78 | $M_i$ | | | |
| 79 | $r$ | | | |
| 80 | | 7 | | |
| 81 | $u_i$ | 1 | 1 | |
| 82 | $u_1$ | 3 | $u_i$ | $u_i-u_1=u_1$ |
| 83 | $u_i$ | 3 | $c_1$ | $u_ic_1$ |
| 84 | $u_2$ | | $u_ic_1$ | |
| 85 | $u_ic_1$ | 4 | $u_ic_1$ | $u_ic_1$ |
| 86 | $u_3$ | | | |
| 87 | $u_4$ | | | |
| 88 | $u_5$ | | | |
| 89 | $u_6$ | | | |
| 90 | $u_7$ | | | |
| 91 | $u_8$ | | | |
| 92 | $u_9$ | | | |
| 93 | $u_{10}$ | | | |
| 94 | $r$ | | | |
| 95 | $M_{ed}$ | | | |
| 96 | $l'_1l_2l_3(e'_1-s_1)$ | | | |
| 97 | $M_{eu}$ | | | |
| 98 | | | | |
| 99 | $r=M_1$ | | | |
| 100 | | | | |

shown all of the signals stored in the 100 cells of the short channel, and adjacent these signals the 47 instruction sequences which are presented to control operation upon these signals during the corresponding recirculations or turns of the information channel that are required for one cycle of operation of the computer. The presence of Instruction 0 is indicated by leaving a blank space in the corresponding position.

For the purpose of illustrating the proper use of Table 4, there is provided immediately after Table 4, an additional and very illustrative table, Table 5, which shows in detail all of the operations performed during turn 1 of the information channel, by displaying all new signals formed in K and in the information channel.

To further clarify and illustrate the operation of the computer, immediately after Table 5, there is provided a complete Key to the successive operations performed at each turn of the information channel. By combined reference to Table 4 and the Key, every operation of the computer may be readily followed.

It may be conveniently assumed in connection with Tables 4 and 5 that the computer and pallet loader 5 are already running in normal operation. The starting up procedure which is manually controlled from control panel 20 is relatively simple and need not be described in detail. It consists merely of applying power to the computer and to pallet loader 5, then clearing (zeroing) all of the cells in the information channel, and then depressing start switch 28 to apply the Start signal to the computer. Clearing is accomplished by depressing a clear switch 30, this having the effect (by cutting off a bias supply B−) of electrically unbalancing each of the computer flip-flops to its zero state, and thus through record flip-flop B, placing 0 valued signals in all of the cells of the information channel.

*Key*

TURN 1

| Cells | Operations | Equation(s) involved |
|---|---|---|
| 1 | Read in $O_i$ | |
| 2 | Record $O_i$ in cell 2 | |
| 8–15 | Form $R'_b+M_i+P_1$ and record in cell 15 | 16. |
| 16–20 | Form $E'_d+P_2$ and record in cell 20 | 16. |
| 21–26 | Form $M_wW_1e'_o$ Stop and record in cell 26 | 16. |
| 37–42 | Form $l_z=l'_1l'_2l'_3$ and record in cell 42 | 3. |
| 49–56 | Form $d_z=d'_1d'_2d'_3d'_4d'_5d'_6$ and record in cell 56 | 8. |
| 61–66 | Form $s_z=s'_1s'_2s'_3$ and record in cell 66 | 11. |
| 70–75 | Form $e_z=e'_1e'_2e'_3$ and record in cell 75 | |
| 80–85 | Begin addition of either 0 or 3 to the $u$ sum in accordance with the value of $u_i$. The signal $u$ is recorded in cell 82. The sum operations are done progressively in turns 1–3, and will be discussed together in connection with turn 3. | |
| 98–99 | Form $M_1$ in K | |

TURN 2

| Cells | Operations | Equation(s) involved |
|---|---|---|
| 1 | Read-out $M_1$. Read-in $O_1$ | |
| 3 | Record $O_1$ in cell 3 | |
| 10–13 | Form $P_0P'_1$ and record in cell 13 | 1. |
| 37–43 | Form $l'_1l_2l_3$ and record in cell 43 | 4. |
| 49–57 | Form $d_o=d'_1d'_2d_3d_4d_5d_6$ and record in cell 57 | 7. |
| 61–62 | Puts $s_1$ in K | 5, 4. |
| 72 | Difference $e_1$ and $s_1$ and record this difference $(e_1-s_1=e_1s'_1+e'_1s'_1)$ in cell 72. | 5, 4. |
| 82–85 | Continue addition to $u$ sum. Signal $W_2$ is formed and recorded in cell 84. (See turn 3 for summary operations). | |

TURN 3

| Cells | Operations | Equation(s) involved |
|---|---|---|
| 1 | Read in $O_r$ | |
| 4 | Record $O_r$ in cell 4 | |
| 8–58 | Form $rR_bl'_o$ and record in cell 58 | 17. |
| 61–67 | Form $s_o=s'_1s'_2s_3$ and record in cell 67 | 10. |
| 70–76 | Form $e_o=e'_1e_2e_3$ and record in cell 76 | 13. |
| 84–93 | Complete $u$ sum. Signals $u_3$, $u_4$, $u_5$, $u_6$, $u_7$, $u_8$, $u_9$ and $u_{10}$ are formed and recorded in their appropriate cells 86–93. To summarize the summing operation: Note in the cell structure that $u_i$ is written in two places (cells 81 and 83), immediately before $u_1$ and $u_2$ respectively. The summing operation is such that the stored digits immediately preceding $u_1$ and $u_2$ are added to $u_1$ and $u_2$. | |

*Key*—Continued

TURN 3

| Cells | Operations | Equation(s) involved |
|---|---|---|
| 84–93 | Thus if the $u_i=0$, then binary 11 or 3 will be added to the $u$ count; while on the other hand if $u_i=0$, 00 (nothing) will be added to the $u$ count. During turn 1, cells 82, 83, 85, the first $u_i$ is differenced with $u_1$, and the result, the new $u_1$ is recorded in cell 82. The carry designated $C_i$ is differenced with the second $u_1$, thus storing $u_i-c_1$ in cell 83 and leaving $u_ic_1$ in K, which is then stored in cell 85. In turn 2, (cells 82–85), the new digit $u_2$ is formed and stored in cell 84, and the next carry $c_2$ is formed in cell 85. The new $u_2$ is formed in accordance with the following equation for the new sum ($u_2$) of the three digits comprising the previous sum ($u_2$), the addend ($u_i$) and an incoming carry ($c_1$). $u_2^{new}=u_2^{old}-u_i-c_1$ The next carry $c_2$ is formed in accordance with the following corresponding carry equation. $c_2=c_1u_2^{old}-c_1u_1-u_2^{old}u_i$ In turn 3, cells 84–93, the new carry $c_2$ is picked up in K and added to the remaining digits in normal manner with the Count instruction. | |

TURN 4

| Cells | Operations | Equation(s) involved |
|---|---|---|
| 1 | Read in $O_s$ | |
| 5 | Record $O_s$ in cell 5 | |
| 10–12 | Form $P_0=P_1$ and record in cell 12 | 1. |
| 23–77 | Form Stop $e_o$ and record in cell 77 | 17. |

TURN 5

| Cells | Operations | Equation(s) involved |
|---|---|---|
| 37–44 | Form $l_1l_2l'_3$ and record in cell 44 | 4. |
| 57–68 | Combine the previously stored signal Stop $e_o$ complementarily with the previously stored signal $rR_bl'_o$ to form $M_i=rR_bl'_o$ (Stop′ + $e'_o$) and stored in cell 68. $M_i$ is also retained in K. | 17. |

TURN 6

| Cells | Operations | Equation(s) involved |
|---|---|---|
| 1 | Read-out $M_i$. Read-in $Oe$ | |
| 7 | Record $Oe$ in cell 7 | 5. |
| 71–72 | Read previously stored signal $e_1-s_1$ complemented into K to form $t_o=e'_1-s_1=e's_1+e'_1s'_1$ in K. | 5. |
| 79 | "And" signal $t_o$ in K with signal $r$ to form $T=rt_o$ in K. | 19. |

TURN 7

| Cells | Operations | Equation(s) involved |
|---|---|---|
| 1 | Read-out T. Read-in $O_w$ | |
| 8 | Record $O_w$ in cell 8 | |
| 26–57 | Form $M_{ro}=rd_oS_b$ in K | 20. |
| 99 | Read-Out $M_{ro}$ | |

TURN 8

| Cells | Operations | Equation(s) involved |
|---|---|---|
| 1–8 | Form $O'_iO'_1O'_rO'_sO'_eO'_w$ in K | 16. |
| 15, 20, 26, 27, 28. | Combine signal in K with the quantities $\underline{\text{Stop}'}(R'_b+M_i+P_1)$, $E'_d+P_2$, $\underline{\text{Stop}}\ M_wW_1e_o$, and $r$ to form new value of $r$ in K. | 16. |
| 29, 79, 94, 99. | Record $r$ in cells 29, 79, 94, 99. Note, cell 99, that $M_1=r$. | 16. |

TURN 9

| Cells | Operations | Equation(s) involved |
|---|---|---|
| 27 | Record $r$ in cell 27 | 16. |
| 42–43, 72, 96. | Combine signals $l'_1l_2l_3$, as previously formed, $e_1-s_1$ to form $l'_1l_2l_3$ $(e'_1-s_1)$ and store in cell 96. | 4. |

TURN 10

| Cells | Operations | Equation(s) involved |
|---|---|---|
| 8–42 | Form $M_{rb}=rl_zR'_b$ in K | 21. |

*Key*—Continued

TURN 11

| Cells | Operations | Equation(s) involved |
|---|---|---|
| 1 | Read $M_{rb}$ out. Read $R_b$ in. | |
| 9-97 | Form $M_{so}$ in K. | 22. |

TURN 12

| Cells | Operations | Equation(s) involved |
|---|---|---|
| 1 | Read out $M_{so}$. Read in $P_1$ | |
| 11 | Record $P_1$ in cell 11 | 23. |
| 17-67 | Form $M_{sb}$ in K. | |

TURN 13

| Cells | Operations | Equation(s) involved |
|---|---|---|
| 1 | Read $M_{sb}$ out—Read $R_o$ in | |
| 30 | Record $R_o$ in cell 30, retaining it in K | |
| 42-55 | Combine with signals $l_z$ and $d_z$ to form $R_ol'_zd_z$ in K. | 2. |

TURN 14

| Cells | Operations | Equation(s) involved |
|---|---|---|
| 13 | Combine with signal $P_oP'_1$ to form $l_i=P_oP'_1+R_ol'_zd_z$ in K. | 2. |
| 36 | Record $l_i$ in cell 36 | 2. |
| 74-75 | Form $e'_z$ in K. | 12. |

TURN 15

| Cells | Operations | Equation(s) involved |
|---|---|---|
| 17, 22 | Form $e'_zE_dW_1$ in K | 12. |
| 65 | Form $e_i=s_c+e'_zE_dW_1$ in K | 12. |
| 70 | Record $e_i$ in cell 70 | 12. |
| 77, 78 | Copy $M_i$ into K | |

TURN 16

| Cells | Operations | Equation(s) involved |
|---|---|---|
| 10 | Record $M_i$ in cell 10 | |
| 31-66 | Form $S_os'_z$ in K | 9. |

TURN 17

| Cells | Operations | Equation(s) involved |
|---|---|---|
| 41 | Form $s_i=l_c+s_oS'_z$ in K | 9. |
| 61 | Record $s_i$ in cell 61 | 9. |
| 94, 95 | Copy $M_{ed}$ into K | |

TURN 18

| Cells | Operations | Equation(s) involved |
|---|---|---|
| 18 | Form $M_{ed}P'_2$ in K | 24. |
| 21 | Record $M_{ed}P'_2$ in cell 21 | 24. |
| 31-68 | Form $s_oS_o$ and store in cell 68 | 24. |
| 75-76 | Form $e_o$ in K | 24. |

TURN 19

| Cells | Operations | Equation(s) involved |
|---|---|---|
| 17 | Form $e_oE'_d$ in K | 24. |
| 21 | "Or" wih $M_{ed}P'_2$ to form $e_oE'_d+M_{ed}P'_2$ in K | 24. |
| 68 | Form $s_oS_o+e_oE'_d+M_{ed}P'_2$ in K | 24. |
| 94, 95 | "And" with $r$ to form $M_{ed}$ in K and record in cell 95. Retain in K. | 24. |
| 99 | Read $M_{ed}$ out, Read $W_1$ in | |

TURN 20

| Cells | Operations | Equation(s) involved |
|---|---|---|
| 22 | Record $W_1$ in cell 22. Retain $W_1$ in K | 15. |
| 23 | Form $M_wW_1$ in K | 15. |
| 76 | Form $ui=M_wW_1e'_o$ in K | 15. |
| 81, 83 | Record $ui$ in cells 81 and 83 | 15. |
| 96, 97 | Form $M_{eu}$ in K | 26. |

TURN 21

| Cells | Operations | Equation(s) involved |
|---|---|---|
| 28 | Start $+M_{eu}$ in K | 26. |
| 81 | Combine with $ui=M_wW_1e'_o$ to form $(M_wW_1e'_o+M_{eu}+\text{Start})$ in K. | 26. |

*Key*—Continued

TURN 22

| Cells | Operations | Equation(s) involved |
|---|---|---|
| 18, 29 | Form $M_{eu}$ in K | 26. |
| 97 | Record $M_{eu}$ in cell 97 | 26. |

TURN 23

| Cells | Operations | Equation(s) involved |
|---|---|---|
| 1 | Read in Stop. | |
| 14 | Record in cell 14 | |
| 20 | Record in cell 20 | |
| 21 | Form $W'_1$ in K | 25. |

TURN 24

| Cells | Operations | Equation(s) involved |
|---|---|---|
| 17-35 | Complete formation of $M_w$ in K | 25. |

TURN 25

| Cells | Operations | Equation(s) involved |
|---|---|---|
| 1 | $M_w$ out. $E_d$ in | |
| 17 | Store $E_d$ in cell 17 | |
| 43-44 | Copy back $l_1l_2l'_3$ into K | 4. |
| 72 | Combine with stored signal to form $l_1l_2l'_3(e_1-s_1)$ in K. | 4. |
| 96 | Combine with stored signal to form $l_o$ in K | 4. |

TURN 26

| Cells | Operations | Equation(s) involved |
|---|---|---|
| 47 | Store $l_o$ in cell 47 | 4. |
| 96, 97 | Form $M_{eu}$ in K | 26. |

TURN 27

| Cells | Operations | Equation(s) involved |
|---|---|---|
| 1 | $M_{eu}$ out. $S_d$ in | |
| 31 | Store $S_d$ in cell 31 | |
| 56, 57 | Form $d'_o$ in K | 6. |

TURN 28

| Cells | Operations | Equation(s) involved |
|---|---|---|
| 30 | Put $d'_o+R_o$ in K | 6. |
| 47, 48 | "And" with $l_o$ to form $d_i$ in K and store in cell 48 | 6. |

TURN 29

| Cells | Operations | Equation(s) involved |
|---|---|---|
| 1 | Read-In Start | |
| 28 | Record in cell 28 | |
| 35, 36 | Put $l_i$ in K | |
| 38-40 | Add $l_i$ (whether 1 or 0) to the $l$ count to form new values of $l_1$, $l_2$, $l_3$. Output carry $l_c$ is retained in K. | $l$ count |
| 41 | Store $l_c$ in cell 41 | $l$ count. |
| 47-48 | Put $d_i$ in K | $d$ count. |
| 50-55 | Add $d_i$ (whether 1 or 0) to the $d$ count to form new values of $d_1 \ldots d_6$. | $d$ count. |
| 60-61 | Put $s_i$ in K | |
| 62-64 | Add $s_i$ (whether 1 or 0) to $s$ count. Output carry $s_c$ is retained in K. | $s$ count. |
| 65 | Store $s_c$ in cell 65 | $s$ count. |
| 69-70 | Put $e_i$ in K | $e$ count |
| 71, 73, 74 | Add $e_i$ to $e$ count forming new values of $e_1$, $e_2$, $e_3$, (in cells 71, 73, 74). | $e$ count. |

TURN 30

| Cells | Operations | Equation(s) involved |
|---|---|---|
| 1 | Read in normal Stop | |
| 25 | Record Stop in cell 25 | |
| 70, 71, 72 | Copy $e_1$ (previously formed in cell 71) into K and record it in cell 72. It will be used in next cycle of operation of computer to form $e_1-s_1$ in cell 72. (See turn 2.) | 4, 5. |

TURN 31

| Cells | Operations | Equation(s) involved |
|---|---|---|
| 1 | Read in $P_2$ | |
| 18 | Record $P_2$ in cell 18 | |
| 19, 20 | Form Stop' in K (Stop was recorded in cell 20 during turn 23). | 27. |
| 29 | Form $A_1=r'$ Stop' in K | 27. |

*Key*—Continued

TURN 32

| Cells | Operations | Equation(s) involved |
|---|---|---|
| 1 | $A_1$ goes out. $S_o$ is Read-In | 27. |
| 32 | Record $S_o$ in cell 32 | |

TURN 33

| | | |
|---|---|---|
| 1 | Read-in $W_2$ | |
| 34 | Store $W_2$ in cell 34 | |

TURN 34

| | | |
|---|---|---|
| 1 | Read-in $W_3$ | |
| 35 | Record $W_3$ in cell 35 | |
| 82, 83 | Put $u_i$ in K | |

TURN 35

| | | |
|---|---|---|
| 24 | Store $u_i = M_w W_1 e'_o$ in cell 24 for (later use in turn 1). | 16. |
| 81, 82 | Put $u_i$ in K | $u$ count out. |

TURN 36

| | | |
|---|---|---|
| 1 | Read-out $u_1$ | |
| 84 | Form $u_2$ in K | |

TURN 37

| | | |
|---|---|---|
| 1 | Read-out $u_2$ | |
| 86 | $u_3$ in K | |

TURN 38

| | | |
|---|---|---|
| 1 | Read out $u_3$ | |
| 87 | $u_4$ in K | |

TURN 39

| | | |
|---|---|---|
| 1 | Read out $u_4$ | |
| 88 | $u_5$ in K | |

TURN 40

| | | |
|---|---|---|
| 1 | Read out $u_5$ | |
| 89 | $u_6$ in K | |

TURN 41

| | | |
|---|---|---|
| 1 | Read out $u_6$ | |
| 90 | $u_7$ in K | |

TURN 42

| | | |
|---|---|---|
| 1 | Read out $u_7$ | |
| 91 | $u_8$ in K | |

TURN 43

| | | |
|---|---|---|
| 1 | Read out $u_8$ | |
| 92 | $u_9$ in K | |

TURN 44

| | | |
|---|---|---|
| 1 | Read out $u_9$ | |
| 93 | $u_{10}$ in K | |

*Key*—Continued

TURN 45

| Cells | Operations | Equation(s) involved |
|---|---|---|
| 1 | Read out $u_{10}$ | |
| | Set a 1 in K | |

TURN 46

| | | |
|---|---|---|
| 1 | Read out the 1 in K to flip-flop $O_t$ serve as signal Synch. | |
| | Signal Synch is thus applied to output segment 46*a*. | |

TURN 47

| | | |
|---|---|---|
| | Throughout the last quarter of turn 46 and the first quarter of turn 47. | |

Since addition of two binary numbers is an operation which is commonly performed in digital computation, the unusual manner in which such an addition is performed in the computer of the present invention is of especial interest. Therefore to further clarify this feature, the selective addition of 3 or 0 to the $u$ count (briefly discussed hereinabove in the Key at Turn 3) will be set forth again, with more explanatory detail, and in addition a simple numerical example of such an addition will be provided.

It will be remembered that the $u$ count comprises a stored ten digit binary number, represented by the successive digit signals: $u_{10}, u_9, u_8, u_7, u_5, u_4, u_3, u_2, u_1$.

At each turn of the drum, if the input signal $u_i$ has a one value ($u_i=1$) then the binary number three (11) is added to the $u$ count; while on the other hand if $u_i$ has a zero value ($u_i=0$) then the binary number zero (00) is added to the $u$ count. In the present machine the decision to add (11) or (00) to the $u$ count is automatically made by adding $u_1$ itself to both the $u_i$ and $u_2$ digits of the $u$ count, as indicated below in Tabulation 1.

TABULATION 1

| | | | | | | |
|---|---|---|---|---|---|---|
| old $u_{10}$ . . . | old $u_4$ | old $u_3$ | old $u_2$ | old $u_1$ | | Old $u$ count |
| | | | $a_2=u_i$ | $a_1=u_i$ | | Addend |
| new $u_{10}$ . . . | new $u_4$ | new $u_3$ | new $u_2$ | new $u_1$ | | Sum (New $u$ count) |
| $c_{10}$ . . . | $c_4$ | $c_3$ | $c_2$ | $c_1$ | $c_0=0$ | Carries |

wherein $u_1^{old}$ . . . $u_{10}^{old}$ are the digit signals of the old $u$ count, $u_i$ and $u_i$ are the addend digit signals $a_1$ and $a_2$, $u_1^{new}$ . . . $u_{10}^{new}$ are the resultant binary sum signals representing the binary digits of the new $u$ count, and $c_1$ . . . $c_{10}$ are the corresponding binary carry signals. Thus $c_1$ is the binary carry resulting from the addition of $u_1^{old}$ and the first $u_i$, signal $c_2$ is the binary carry resulting from the addition of $u_2^{old}$, the second $u_i$, and the previous carry $c_1$, etc.

To illustrate this numerically, suppose that the old $u$ count is five (0 . . . 0101) and that $u_i=1$ so that a count of three (11) is to be added to the old $u$ count, to produce a new sum count of eight (0 . . . 1000) and also corresponding carries. This is shown in Tabulation 2, where the assumed binary values of the $u^{old}$ and $u_i$ digits are written in parenthesis, immediately after the corresponding digit signals, and the resultant binary values of the sum and carry digits are similarly written.

TABULATION 2

| | | | | | | | |
|---|---|---|---|---|---|---|---|
| old $u_{10}^{(0)}$ . . . | | old $u_4^{(0)}$ | old $u_3^{(1)}$ | old $u_2^{(0)}$ | old $u_1^{(1)}$ | | Old $u$ count |
| | | | | $a_2=u_i^{(1)}$ | $a_1=u_i^{(1)}$ | | Addend |
| new $u_{10}^{(0)}$ . . . | | new $u_4^{(1)}$ | new $n_3^{(0)}$ | new $u_2^{(0)}$ | new $u_1^{(0)}$ | | Sum (new $u$ count) |
| $u_{10}^{(0)}$ | $c_4^{(0)}$ | $c_3^{(1)}$ | $c_2^{(1)}$ | $c_1^{(1)}$ | | $c_0^{(0)}$ | Carries |

Tabulations 1 and 2 thus summarize the overall functions which are accomplished, in the formation of the new $u$ sum and the corresponding carries. Considering now, the detailed way in which the sum and carry digits are generated, the general logical equations (expressed in different form) for any binary sum and carry digits $u^{new}$ and $c^{new}$ are as follows:

$$u^{new}=u^{old}-a-c_{-1}$$
$$c=c_{-1}u^{old}-c_{-1}a-u^{old}a$$

where $a$ is a generalized symbol for an addend digit and $c_{-1}$ designates the carry from the preceding addition. These equations merely state the familiar rule that the sum digit will be 1 if one or three of the digits being added is 1; and that the carry digit will be 1 if two or three of the digits added is 1.

Specific logical equations for $u_1^{new}$ and $c_1$, $u_2^{new}$ and $c_2$, $u_3^{new}$ and $c_3$, etc., may be immediately written by substituting in the above general equations; remembering that $c_0=0$, that $a_1=u_i$, $a_2=u_i$, and that remaining addend digits are 0. These equations are:

$$u_1^{new}=u_1^{old}-u_i$$
$$c_1=u_1^{old}u_i$$

and as presented hereinbefore:

$$u_2^{new}=u_2^{old}-u_i-c_1$$
$$c_2=c_1u_2^{old}-c_1u_i-u_2^{old}u_i$$

and also:

$$u_3^{new}=u_3^{old}-c_2$$
$$c_3=u_3^{old}c_2$$
$$u_4^{new}=u_4^{old}-c_3$$
$$c_4=u_4^{old}c_3, \text{ etc.}$$

The detailed manner in which the new sum and corresponding carry digits are formed in accordance with these logical equations by stepwise operations (during turns 1, 2 and 3) upon the $u^{old}$ and $u_i$ signals stored in the cells of the information channel, is shown in the following Table 6. The numerical example described above of the addition of three to five to obtain a new sum of eight is also illustrated in Table 6.

In the further manipulations thereon, for purposes of clarification each signal formed is designated by its complete logical expression and also in accordance with the numerical example the corresponding binary value of the signal is provided in parentheses.

It is thus made apparent how the sum signals $u^{new}$ and carry signals $c$, are formed by stepwise operation in accordance with their defining logical equations. Moreover, following through the simultaneously presented numerical example, it can be seen exactly how the values of successive sum and carry signals would be formed, in this example. Note that the values obtained for $u_4^{new}$, $u_3^{new}$, $u_2^{new}$, $u_2^{new}$, $u_1^{new}$ are 1000, thus representing a sum of eight as required. Similarly, the values obtained for $c_3$, $c_2$, $c_1$ are 1, 1, 1, thus again satisfying the numerical example of Tabulation 2.

What is claimed as new is:

1. A digital computer comprising: a first cyclically operable memory device including a relatively short information loop for storing digital information signals to be operated upon, and a first read station for serially presenting the signals stored in said loop; a second cyclically operable memory device operable in synchronism with said first device, said second device including a relatively long program loop for storing program signals representing operational instructions, and a second read station for serially presenting the signals stored in said program loop; and an operating circuit for serially operating on the signals presented at said first read station, in accordance with the instructions simultaneously represented at said second read station, to serially produce digital output signals representing the results of the operations.

2. The computer defined in claim 1, wherein said second cyclically operable memory device includes a plurality of channels having corresponding series of signals stored therein, and a corresponding plurality of read points, one for each channel, the combination of signals simultaneously presented at said read points representing the operational instruction.

3. The computer defined in claim 1 wherein the cycle of operation of said second device is at least ten times

TABLE 6

| 87 | 86 | 85 | 84 | 83 | 82 | 81 | 80 | Cell No. |
|---|---|---|---|---|---|---|---|---|
| | | | | | | | | TURN 1 |
| $u_4^{old}$ (0) | $u_3^{old}$ (1) | | $u_2^{old}$ (0) | $u_i$ (1) | $u_1^{old}$ (1) | $u_i$ (1) | | Signal |
| | | 4 | | 3 | 3 | 1 | 7 | Instruction |
| (1) | (1) | $u_ic_1$ (1) | $u_ic_1$ (1) | $c_1=u_1^{old}u_i$ (1) | $u_i$ (1) | (1) | | Signal in K |
| | | | | | | | | TURN 2 |
| (0) | (1) | $u_ic_1$ (1) | (0) | $u_i-c_1$ (0) | $u_1^{new}=u_1^{old}-u_i$ (0) | (1) | | Signal |
| | | 3 | 3 | 1 | 7 | | | Instruction |
| | (0) | $u_2^{old}(u_i-c_1)$ (0) | $u_i-c_1$ (0) | 1 (1) | | | | Signal in K |
| | | | | | | | | TURN 3 |
| (0) | (1) | $c_2=u_2^{old}u_i-u_2^{old}c_1-u_ic_1$ (1) | $u_2^{new}=u_2^{old}-u_i-c_1$ (0) | (0) | (0) | | | Signal |
| 3 | 3 | 1 | 7 | | | | | Instruction |
| $c_3=u_3^{old}c_2$ (1) | $c_2$ (1) | (1) | | | | | | Signal in K |
| | | | | | | | | TURN 4 |
| $u_4^{new}=u_3^{old}-c_3$ (1) | $u_3^{new}=u_3^{old}-c_2$ (0) | | $u_2^{new}$ (0) | | $u_1^{new}$ (0) | | | Signal |

It will be noted, referring to Table 6, that the two $u_i$ signals are initially stored in cells 81 and 83, while the signals of the old $u$ count $u_1^{old}$, $u_2^{old}$, $u_3^{old}$, $u_4^{old}$ . . . are stored in cells 82, 84 and 85, 86, 87 . . . respectively. For the purposes of the numerical illustration, assumed values for each of these signals (corresponding to those of Tabulation 2) are written in parentheses after each signal. (Thus the old $u$ count represents the number five and the two $u_i$ signals represent the number three.)

as long as the cycle of operation of said first device, said second device having stored therein program signals representing at least ten different sequences of instructions corresponding respectively to predetermined cycles of operation of said first device, said second read station including apparatus for presenting each of said sequences of instructions during the corresponding cycle of operation of said first device.

4. A digital computer comprising: a first cyclically operable memory device including a relatively short information loop for storing a series of digital information signals to be operated upon, and a first read station for serially presenting the signals stored in said loop; a second cyclically operable memory device operable in synchronism with said first device, said second device including a relatively long program loop for storing program signals representing operational instructions upon at least two digital signals, and a second read station for serially presenting the signals stored in said program loop; and an operating circuit, serially operable on the signals presented at said first read station in accordance with the instructions simultaneously represented at said second read station, for applying to said short information loop a corresponding series of signals representing the results of the operations.

5. A digital computer comprising: a first cyclically operable memory device including a relatively short information loop for storing digital information signals to be operated upon, and a first read station for serially presenting the signals stored in said loop; a second cyclically operable memory device operable in synchronism with said first device, said second device including a relatively long program loop for storing program signals representing operational instructions upon at least two digital signals, and a second read station for serially presenting the signals stored in said program loop; a storage element for storing a digital output signal; and operational means, operable in accordance with each instruction represented by said program signals, for operating upon only a single one of the information signals stored in said short loop to store in said storage element a new digital output signal representing the result of the corresponding operation upon the old output signal and the said single signal presented at said first read station.

6. A digital computer comprising: a first cyclically operable memory device including a relatively short information loop for storing digital information signals to be operated upon, a first read station for serially presenting the signals stored in said loop, and a write station for writing signals into said loop; a second cyclically operable memory device operable in synchronism with said first device, said second device including a relatively long program loop for storing program signals representing operational instructions upon at least two digital signals, and a second read station for serially presenting the signals stored in said program loop; a storage element for storing digital output signals; first means, operable in accordance with each instruction represented at said second read station by said program signals, for storing in said storage element a new digital output signal representing the result of one corresponding operation upon the old output signal and the signal simultaneously presented at said first read station; and second means, simultaneously operable in accordance with each instruction, for applying to said write station a signal representing the result of another corresponding operation upon said old output signal and said signal presented at said first read station.

7. The digital computer defined in claim 6, wherein said long program loop includes instruction storage means for storing a series of combinations of bivalued signals, each combination defining an operational instruction, and said second read station includes means for simultaneously presenting the bivalued signals of each combination.

8. The digital computer defined in claim 7, wherein said instruction storage means includes three storage registers operable in synchronism with each other.

9. The digital computer defined in claim 6, wherein said first means is operable in accordance with one instruction for storing in said storage element a new digital output signal representing the Boolean product of the value represented by the old digital output signal and the value represented by the signal presented at said first read station.

10. The digital computer defined in claim 9, wherein said second means is operable in accordance with one instruction for applying to said write station a signal representing the Boolean difference between the value represented by the old output signal and the value of the signal presented at said first read station.

11. In a digital computer, the combination comprising: an information storage device including a plurality of storage cells each having a bivalued information signal stored therein, a read station for reading the signal stored in each cell presented thereto, and means for serially presenting the plurality of storage cells to said read station for a plurality of successive cycles; and an instruction storage device, operable in synchronism with said information storage device, for presenting during each cycle of said information storage device a combination of instruction signals for each cell presented at said read station, each combination representing a logical operation, said information storage device including means for presenting at least three different combinations of instruction signals representing three different logical operations, respectively for each cell of a number of said plurality of cells.

12. In a digital computer, the combination comprising: an information storage device including $n$ storage cells for storing $n$ bivalued information signals, respectively, where $n$ is an integer, a read station for reading the signal stored in each cell presented thereto, and means for serially presenting said $n$ storage cells to said read station for $m$ successive cycles, where $m$ is an integer different from $n$; and an instruction storage device, operable in synchronism with said information storage device, for cyclically presenting $m$ series of $n$ combinations of instruction signals during the $m$ cycles of said information storage device, at least three series of said $m$ series being different.

13. The combination defined by claim 12 wherein said instruction storage device includes apparatus for presenting at least ten different series of said $m$ series.

14. The combination defined in claim 12, wherein said instruction storage device includes means for presenting $k$ different series of combinations of instruction signals, where $k$ is an integer at least an order of magnitude greater than one.

15. The combination defined in claim 12, wherein said instruction storage device includes means for presenting $k$ different series of combinations of instruction signals, where $k$ is an integer $\geqq 10$.

16. In a digital computer, the combination comprising: an information storage device including $n$ storage cells for storing $n$ bivalued information signals, respectively, where $n$ is an integer, a read station for reading the signals stored in each cell presented thereto, and means for serially presenting said $n$ storage cells to said read station for $m$ successive cycles, where $m$ is an integer; and an instruction storage device, operable in synchronism with said information storage device, for presenting $m$ series of $n$ combinations of instruction signals duirng the $m$ cycles of said information storage device, each combination of instruction signals representing a logical operation, said instruction storage device including means for presenting at least $k$ different series of combinations of instruction signals, where $k$ is an integer of the same order of magnitude as $m$.

17. The combination defined in claim 16, wherein said instruction storage device includes at least two storage means operable in synchronism with each other, each of said storage means having $m$ times $n$ storage cells.

18. The combination defined in claim 16, wherein said information storage device includes a recirculating register having $n$ storage cells, and said instruction storage device includes at least two registers, each having $m$ times $n$ storage cells.

19. The combination defined in claim 16, wherein said information storage device includes a recirculating register having at least 100 storage cells, and said instruction storage device includes at least two registers, each having at least 4700 storage cells.

20. A digital computer comprising: an information storage device including $n$ storage elements for respectively storing $n$ bivalued information signals to be operated upon, where $n$ is an integer, a read station for reading the signal stored in each element presented thereto, and means for serially presenting said $n$ storage elements to said read station for $m$ successive cycles, where $m$ is an integer; an instruction storage device, operable in synchronism with said information storage device, for presenting $m$ series of $n$ combinations of bivalued instruction signals during the $m$ cycles of said information storage device, each combination representing a logical operation to be performed on the corresponding signal in the storage element presented to said read station; and an operating circuit, responsive to each combination of instruction signals, for performing the represented logical operation upon the corresponding information signal.

21. The digital computer defined in claim 20, wherein the signals presented at said read station are read as successive bivalued signals A and wherein said instruction storage device includes means for presenting eight different combinations, designated as combinations 0, 1, 2 . . . 7 respectively, of instruction signals, said operating circuit including a bistable storage element, and being responsive to said eight combinations of instruction signals for forming bivalued output signals designated B and for actuating said bistable element to store bivalued signals designated K therein in accordance respectively with the following logical operations:

(0) B=A, K=K
(1) B=A, K=AK
(2) B=A, K=A'K
(3) B=A−K, K=AK
(4) B=K, K=K
(5) B=A
(6) B=A, K=A+K
(7) B=A, K=1 where the symbol + represents the logical "or" operation, the absence of a + represents the logical "and" operation, the suffix symbol ' represents the logical complement operation, and the symbol — represents the logical difference operation.

22. The digital computer defined in claim 21, wherein said operating circuit includes first and second signal combinnig circuits for generating signals B and K in accordance with the following Boolean equations, respectively:

$$B=(AK'+A'K)(3)+K(4)+A(0+1+2+5+6+7)$$
$$K=AK(1+3)+A'K(2)+(A+K)(6)+I(7)+K(0+4)$$

where the symbol + represents the logical "or" operation, the absence of a + represents the logical "and" operation and the suffix symbol ' represents the logical complement operation.

23. The digital computer defined in claim 22, wherein said information storage device includes a write station for serially writing signals into said storage elements, and means for applying signal B to said write station.

24. The digital computer defined in claim 23, which further includes means for generating a multiplexed input signal I representing applied input quantities, and for storing these quantities in said bistable storage element whenever the instruction signal combination (5) is presented in accordance with the equation K=I(5).

25. In a digital computer, apparatus for setting a bistable device to a stable state representative of the Boolean "and" function of a plurality of stored bivalued signals, each stored signal representing either the binary "1" value or the binary "0" value, said apparatus comprising: first means for initially setting the bistable device to a predetermined one of its stable states representing the binary "1" value; second means for serially reading each of the stored signals; and third means coupled to said second means, and operable for setting the bistable device to the other of its states representing the binary 0 whenever any of the signals read represents the binary 0 value, whereby the final state of the bistable device is 1 representing only if all of the stored signals are 1 representing.

26. In a digital computer, apparatus for setting a bistable device to a stable state representative of the Boolean "and" function of the values of a first plurality of stored bivalued signals and of the complements of the values of a second plurality of stored bivalued signals, said apparatus comprising: first means for initially setting the bistable device to a predetermined one of its stable states representing the binary one value; second means for serially reading each of the stored signals; and third means coupled to said second means and operable for setting the bistable device to the other of its states representing the binary 0 value whenever any of the signals of the first plurality read has the binary 0 value or any of the signals of the second plurality read has the binary 1 value, whereby the final stable state of the device is 1 representing only if all of the signals of the first plurality have 1 values and all of the signals of the second plurality have 0 values.

27. Computing apparatus for setting a bistable device to a state representative of a predetermined Boolean function of $n$ variables represented by a corresponding number of bivalued information signals $A_1 \ldots A_j, A_{j+1} \ldots A_n$ stored in a cyclically operable memory, the bistable device forming a bivalued output signal representative of its stable state, said computing apparatus comprising: first means for initially setting the bistable device to a predetermined state; second means for serially and repetitively reading signals stored in said cyclically operable memory; third means for receiving from said second means each of the signals $A_1 \ldots A_j$ read and operable in response to each successive signal received for setting the bistable device to a state representative of a predetermined Boolean function of the information signal and the prior state of the bistable device; fourth means coupled to said bistable device and operable after all of the signals $A_1 \ldots A_j$ are received for storing the corresponding output signal, designated the intermediate signal, in said cyclically operable memory; fifth means operable after an operation of said fourth means for setting the bistable device to a predetermined state; sixth means operable after an operation of said fifth means for receiving from said second means the output signal and the information signals $A_{j+1} \ldots A_n$ and the intermediate signal and responsive to each successive signal received for setting the bistable device to a state representative of a predetermined Boolean function of the two quantities represented by the received signal and the previous state of the bistable device.

28. A digital computer comprising: a cyclically operable memory apparatus for storing a plurality of information signals $A_1 \ldots A_j, A_{j+1} \ldots A_n$ and including first reading apparatus for serially reading said signals during each cycle of operation; a cyclically operable programming apparatus synchronized with said memory apparatus and having a second cycle of operation at least equal in duration to a plurality of said first cycles of operation, said programming apparatus being operable during each cycle of operation of said memory apparatus whenever one of the signals $A_1 \ldots A_n$ is read respectively for forming a plurality of bivalued program signals representing a predetermined Boolean function of two variables; a bistable device selectively settable to a first or second stable state, representing a first or second value respectively; a gating matrix coupled to said bistable device and receiving each signal read by said reading apparatus, and the corresponding plurality of programming signals, said gating matrix being operable in response to each plurality of programming signals for setting the bistable device to a stable state representative of the corresponding Boolean function of the quantities represented by the previous state of the bistable device and the corresponding information signal.

29. The digital computer defined by claim 28 wherein said second cycle of operation is equal in duration to at least 10 of said first cycles of operation and wherein said programming apparatus includes means for presenting program signals representating, during corresponding first cycles of operation, at least 10 different sequences of Boolean functions.

30. A control apparatus for controlling the condition of a physical system, said control apparatus comprising: sensing means for producing a plurality of bivalued input signals representing the condition of the physical system; actuating means operable in response to application of predetermined required control signals for correctly changing the condition of the physical system; a cyclically operable electronic digital computer for receiving and serially operating upon the input signals during each cycle of operation to form said required control signals, said computer including a cyclically operable short memory channel having $m$ cycles of operation during each cycle of operation of said computer, first means selectively operable for recording the input signals in said short memory channel, a long memory channel for synchronously presenting a corresponding sequence of instructions during each of said $m$ cycles of operation, and second means for serially operating upon the signals in said short memory channel during each of said $m$ cycles of operation in accordance with the corresponding sequence of instructions to form the control signals; and apparatus for applying the control signals to said actuating means.

31. The control apparatus defined by claim 30 wherein said long channel includes apparatus for presenting at least 10 different sequences of instructions during each of said cycles of operation of said computer.

32. In an automatically controlled pallet loader of the type including a plurality of pallet and box manipulating devices, namely a Ram, a Stripper and Elevator, a Withdrawal Conveyor, an Input Conveyor, a Line Conveyor and a Box Turner, each of said manipulating devices being independently actuable in response to application of corresponding control signals and cooperatively operable, when suitably actuated, for stacking entering boxes on pallets and withdrawing loaded pallets, an automatic control system comprising a plurality of sensing devices, each of said sensing devices producing the bivalued sensing signal representative of a corresponding condition of one of the manipulating devices, said plurality of sensing devices including a box counting device; a cyclically operable electronic digital computer for receiving and operating upon the sensing signals during each cycle of operation to form corresponding control signals, each control signal representating at least in part a predetermined Boolean function of the values of a corresponding group of said sensing signals, said computer including a cyclically operable short memory channel having a plurality $m$ of cycles of operation during each cycle of operation of said computer, first means selectively operable for recording sensing signals in said short memory channel, a long memory channel for presenting a corresponding sequence of instructions during each of said $m$ cycles of operation, and second means for serially operating upon signals in the short channel during each of said $m$ cycles of operation in accordance with the corresponding sequence of instructions to form the control signal; and apparatus for applying the control signals to said manipulating devices.

33. The automatic control system defined by claim 32 wherein said long memory channel includes apparatus for presenting at least 10 different sequences of instructions during each cycle of operation of said computer.

34. In a simplified cyclically operable digital computer, apparatus for combining the bivalued digit signals of two member signals stored in a short cyclically operable memory channel having a plurality $m$ of cycles of operation during each cycle of operation of said computer to form and record in the short memory channel a set of result digit signals representing the numerical sum of the two numbers, said apparatus comprising: first means operable during a first predetermined cycle of operation of the short channel for combining the signals of the two number signals to form and record in the short channel a set of intermediate result digit signals; and second means operable in a later second predetermined cycle of operation of the short channel for combining said intermediate result digit signals with the digit signals of the two number signals to form and record in the short channel at least one of said result digit signals.

35. The apparatus defined by claim 34 which further includes third means operable during each of a plurality of later cycles of operation of said short channel for combining said intermediate result digit signals with the digit signals of said number signals to form at least one corresponding additional result digit signal.

36. The apparatus defined by claim 34 wherein said first means includes first apparatus for combining one digit signal of one of said number signals with the corresponding digit signal of the other of said number signals to form the corresponding sum and carry digit signals and further includes second means for recording the sum digit signal and for combining the carry digit signal with one of the next higher order addend digit signals of the two number signals to form and record in the short channel an intermediate sum digit signal and an intermediate carry digit signal.

37. The apparatus defined by claim 36 wherein said second means includes second apparatus for combining the intermediate sum digit signal and the remaining addend digit signal to form and record in the channel the corresponding result sum digit signal.

38. In a simplified cyclically operable digital computer apparatus for combining three binary digit signals to form the corresponding sum and carry digit signals, a pair of the binary digit signals being stored in a cyclically operable short memory channel having a plurality $m$ of cycles of operation during each cycle of operation of the computer, and the third digit signal being stored in a bistable circuit device, said apparatus including: first means operable during a first predetermined cycle of operation of said short channel for combining the digit signal stored in the bistable device with one of the pair of digit signals stored in the short channel to form and record in the short channel an intermediate sum digit signal representing their logical differences, and second means operable during a later second predetermined cycle of operation of the short channel for combining the intermediate sum digit signal with the other of the pair of digit signals in accordance with the logical difference operation to form and record in the short channel the corresponding sum digit signal.

39. The apparatus defined by claim 38 wherein said first means includes first apparatus for combining the third digit signal with the one of the pair of digit signals in accordance with the logical "and" operation to form and store in the short channel a first intermediate carry digit signal; and wherein said second means includes second apparatus for combining the intermediate resultant signal with the other of said pair of digit signals in accordance with the logical "and" operation to form a second intermediate carry signal and further includes third apparatus for combining the first and second intermediate carry signals in accordance with the logical difference operation to form the corresponding carry signal.

40. In a digital computer, the combination comprising: an information storage device including a plurality of storage cells each having a bivalued information signal stored therein, a read station for reading the signal stored in each cell presented thereto, and means for serially presenting the plurality of storage cells to said read station for a plurality of successive cycles; and an instruction storage device, operable in synchronism with said information storage device, for presenting during each cycle of said information storage device a combination of instruction signals for each cell presented at said read station, each combination representing a logical operation, said instruction storage device including means for presenting at least three different combinations of instruction signals representing three different logical operations respectively, for each cell of a number of said plurality of cells; and an operating circuit responsive to each combination of instruction signals presented by said instruction storage device, for performing the corresponding logical operation upon the information signal simultaneously presented at said read station.

41. In a digital computer, the combination comprising: an information storage device including $n$ storage cells for storing $n$ bivalued information signals, respectively, where $n$ is an integer, a read station for reading the signals stored in each cell presented thereto, and means for serially presenting said $n$ storage cells to said read station for $m$ successive cycles, where $m$ is an integer; and an instruction storage device, operable in synchronism with said information storage device, for presenting $m$ series of $n$ combinations of instruction signals during the $m$ cycles of said information storage device, each combination of instruction signals representing a logical operation, said instruction storage device including means for presenting at least $k$ different series of combinations of instruction signals, where $k$ is an integer of the same order of magnitude as $m$; and an operating circuit responsive to each combination of instruction signals presented by said instruction storage device, for performing the corresponding logical operation upon the information signal simultaneously read by said read station.

References Cited in the file of this patent

UNITED STATES PATENTS

| | | |
|---|---|---|
| 2,633,251 | Bruce | Mar. 31, 1953 |
| 2,699,264 | Bruce | Jan. 11, 1955 |
| 2,703,182 | Broberg et al. | Mar. 1, 1955 |
| 2,735,082 | Goldberg et al. | Feb. 4, 1956 |
| 2,808,986 | Stone et al. | Oct. 8, 1957 |
| 2,852,189 | Becker et al. | Sept. 16, 1958 |
| 2,874,901 | Holmes | Feb. 24, 1959 |
| 2,924,381 | Eckdahl et al. | Feb. 9, 1960 |
| 2,935,736 | Walters | May 3, 1960 |
| 2,995,729 | Steele | Aug. 8, 1961 |

FOREIGN PATENTS

| | | |
|---|---|---|
| 526,058 | Belgium | Feb. 15, 1954 |
| 770,952 | Great Britain | Mar. 27, 1957 |

OTHER REFERENCES

Bolles et al.: "Control Elements in the Computer," Control Engineering, August 1956.